(12) United States Patent
Ashkenazi

(10) Patent No.: US 8,079,713 B2
(45) Date of Patent: Dec. 20, 2011

(54) NEAR EYE DISPLAY SYSTEM

(75) Inventor: Asaf Ashkenazi, Zichron Yaakov (IL)

(73) Assignee: Elbit Systems Ltd., Haifa (IL)

( * ) Notice: Subject to any disclaimer, the term of this patent is extended or adjusted under 35 U.S.C. 154(b) by 777 days.

(21) Appl. No.: 12/066,605

(22) PCT Filed: Aug. 24, 2006

(86) PCT No.: PCT/IL2006/000985
§ 371 (c)(1),
(2), (4) Date: Sep. 3, 2008

(87) PCT Pub. No.: WO2007/031986
PCT Pub. Date: Mar. 22, 2007

(65) Prior Publication Data
US 2009/0147331 A1    Jun. 11, 2009

(30) Foreign Application Priority Data

Sep. 12, 2005  (IL) .......................................... 170825
Jan. 25, 2006  (IL) .......................................... 173361

(51) Int. Cl.
*G02B 21/00* (2006.01)
(52) U.S. Cl. ............. 353/33; 359/630; 359/831; 356/19
(58) Field of Classification Search .................... 353/28, 353/30–37, 81; 345/1.1–3.4; 348/135–136; 356/19, 5.1, 5.01, 152.5; 359/196.1–226.3, 359/630, 831–837
See application file for complete search history.

(56) References Cited

U.S. PATENT DOCUMENTS

| | | |
|---|---|---|
| 4,867,551 A | 9/1989 | Perera |
| 5,153,774 A | 10/1992 | Migozzi et al. |
| 5,162,828 A | 11/1992 | Furness et al. |
| 5,293,271 A | 3/1994 | Merritt et al. |

(Continued)

FOREIGN PATENT DOCUMENTS

EP    0 459 850    12/1991
(Continued)

*Primary Examiner* — Jennifer L. Doak
(74) *Attorney, Agent, or Firm* — Merchant & Gould P.C.

(57) ABSTRACT

A near eye image display system includes an image projector, a beam combiner assembly, and an optical assembly, optically coupled between the image projector and the beam combiner assembly. The image projector projects a display image toward an optical pathway, the optical pathway intersecting a viewing axis, the viewing axis extending from the eye of a user to an ambient scene. The beam combiner assembly includes a plurality of beam combiners optically cascaded along the optical pathway, each of the beam combiners being disposed diagonally to the optical pathway and diagonally to the viewing axis. Each of the beam combiners is arranged such that for each two adjacent beam combiners, the first of the adjacent beam combiners is optically located between the second of the adjacent beam combiners and the image projector. The geometrical projection of the second beam combiner onto a first plane perpendicular to the optical pathway, is subsumed within the geometrical projection of the first beam combiner onto the first plane. Each of the beam combiners is further arranged such that the partial geometric projection of each of the beam combiners onto a second plane perpendicular to the viewing axis forms a continuous geometric projection, the optical assembly directing display light of the display image from the image projector toward the beam combiner assembly along the optical pathway. Each of the beam combiners reflects the display light toward the eye, and further directs ambient light emerging from the ambient scene toward the eye, thereby superimposing the display image onto the ambient scene.

49 Claims, 12 Drawing Sheets

U.S. PATENT DOCUMENTS

| | | |
|---|---|---|
| 5,348,477 A | 9/1994 | Welch et al. |
| 5,745,287 A * | 4/1998 | Sauter ............................ 359/428 |
| 5,886,822 A | 3/1999 | Spitzer |
| 6,204,974 B1 | 3/2001 | Spitzer |
| 6,292,314 B1 * | 9/2001 | Perger ............................ 359/834 |
| 6,392,811 B1 | 5/2002 | Lindau |
| 6,618,099 B1 | 9/2003 | Spitzer |
| 7,349,073 B2 * | 3/2008 | Dunne ......................... 356/4.01 |
| 2002/0051118 A1 | 5/2002 | Takagi et al. |

FOREIGN PATENT DOCUMENTS

| | | |
|---|---|---|
| FR | 1 581 252 | 12/1969 |
| GB | 1 192 465 | 8/1967 |
| GB | 1 264 343 | 2/1972 |
| WO | WO 88/02494 | 4/1988 |
| WO | WO 95/11473 | 4/1995 |

* cited by examiner

NEAR EYE DISPLAY SYSTEM

FIELD OF THE DISCLOSED TECHNIQUE

The disclosed technique relates to display systems, in general, and to a head-mounted see-through near eye display system, in particular.

BACKGROUND OF THE DISCLOSED TECHNIQUE

Display systems that are mounted on eyewear or head gear are known in the art. Such display systems may be mounted onto eyeglasses, spectacles, goggles, helmets, and the like, or otherwise supported before a viewer to present an image from a display device to the viewer. Display systems may be used in a variety of different applications. For example, one such application is a virtual display terminal, in which a user views video data from a portable device, such as a Digital Video Disc (DVD) player or a high end game station. Another application is a Head-Up Display (HUD) in the cockpit of an aircraft, in which a pilot views flight related information (e.g., altitude, airspeed, heading) while maintaining external situational awareness.

There are two general categories of display systems: see-through systems and opaque systems (i.e., non see-through systems). In see-through systems, the display image is combined with the ambient scenery, enabling the user to view both the display image and the ambient scene simultaneously. Usually, the display image appears superimposed onto an image from the ambient scene. In opaque systems, the display image blocks out the ambient scene, either partially or completely, so that the user is unable to view at least a part of the ambient scene. See-through display systems serve to minimize user obscuration and are useful for applications where it is important that the user does not miss any information from the external environment. However, see-through display systems inherently reduce the amount of energy passing from the display device to the eye of the user (i.e., to enable transmission of ambient light), resulting in a poor contrast ratio between the display image and the ambient scene. See-through display systems also tend to be somewhat bulky and cumbersome, owing to the general dimensions of the display device and the optical elements that are directed to eliminating distortion.

In contrast, opaque display systems generally have a simple overall assembly, although they tend to introduce physical discomfort to the user, mainly due to the loss of situational awareness (i.e., since the opaque display obstructs visibility of the scene to a selected eye of the user, depriving scenic details from the user, thereby reducing the ability of the user to understand and react to events occurring in the surrounding area). For example, in monocular opaque display systems, the user may suffer from eye rivalry (i.e., when the images provided to each eye are mutually exclusive and have no common points for the brain to sufficiently link the two into a unified image, the visual perception of the viewer alternates between the views seen by each eye). Since human factor issues, such as user comfort, are critical, see-through display systems are usually preferred over opaque display systems.

Several existing display systems have small general dimensions but do not provide a wide enough field of view for viewing the display image. Other small see-through display systems do not provide sufficient eye-relief, for allowing correcting spectacles (e.g., eyeglasses) in between the eye and the eyepiece of the display system. Some display systems have a small eye motion box (i.e., exit pupil diameter), which results in image loss if the display moves during use. Some display systems have low display brightness, causing a low contrast ratio in conditions with high ambient light levels. Other features play a key role in the quality and overall performance of the display system, such as the system dimensions, weight, center of gravity, display resolution, color correction, contrast, optical focal length, obscuration, and the like.

One technique for obtaining the required focal length in a compact visual system, commonly used in binoculars, small telescopes, and occasionally in cameras, involves a pair of Porro prisms. A Porro prism is a block of glass, triangular in cross-section, with angles of 45°, 45° and 90°. Reference is now made to FIG. 1, which is a schematic illustration of a double Porro prism assembly, generally referenced 10, which is known in the art. Double Porro prism assembly 10 includes a pair of Porro prisms, referenced 12 and 14. The three surfaces of first Porro prism 12 are referenced 16, 18 and 20, respectively. The three surfaces of second Porro prism 14 are referenced 22, 24 and 26, respectively. Porro prisms 12 and 14 are arranged such that the long surface 20 of first Porro prism 12 is adjacent to the long surface 26 of second Porro prism 14. An incoming light beam enters first Porro prism 12 via surface 20, at a substantially vertical direction, along path 30A. The incoming light beam is incident upon surface 16, which internally reflects the light beam at a substantially horizontal direction along path 30B toward surface 18. Surface 18 internally reflects the light beam to second Porro prism 14 at a substantially vertical direction, along path 30C. The light beam exits first Porro prism 12 via surface 20 and enters second Porro prism 14 via surface 26. The light beam is then incident upon surface 22, which internally reflects the light beam at a substantially horizontal direction along path 30D toward surface 24. Surface 24 then internally reflects the light beam at a substantially vertical direction along path 30E toward surface 26, upon which the light beam exits double Porro prism assembly 10. Overall, the light beam undergoes a total of four reflections within double Porro prism assembly 10. It is noted that in a double Porro prism assembly, the incoming axis and the outgoing axis of the light beam are not aligned. Porro prisms provide minimal light loss and image degradation, but are typically large and bulky and require a large housing.

Conventional eyepieces in display systems use a single beam combiner, or an equivalent optical element (e.g., a partially transparent lens or mirror), to direct the light from the display image and the light from the ambient scenery toward the eye of the user. Reference is now made to FIG. 2, which is a schematic illustration of a single beam combiner eyepiece, generally referenced 50, which is known in the art.

U.S. Pat. No. 5,348,477 to Welch et al entitled "High definition television head mounted display unit", is directed to a head mounted non-pupil forming display system which uses a projection screen to produce a replica of an image for viewing by an observer. The display system includes an imaging source, a fiber optic cable, a relay lens, and an optical assembly. The optical assembly includes a projection lens, a rear projection screen, a beam splitter, a plurality of mirrors, and an eyepiece. The rear projection screen includes a left rear projection screen associated with the left eye of the observer, and a right rear projection screen associated with the right eye of the observer. The eyepiece includes a spherical mirror and a flat beam splitter. The imaging source may be a high definition television projector. The eyepiece is disposed in front of the eyes of the observer.

The imaging source generates an image and relays the image to the fiber optic cable through the relay lens. The fiber optic bundle transmits the image to the projection lens. Part of the output of the projection lens is deflected by the beam splitter to a first mirror, which reflects the light beam to the left rear projection screen. The left rear projection screen is on top of the part of the eyepiece in front of the left eye of the observer. The beam splitter deflects the remainder of the output of the projection lens to a second mirror, which reflects the light beam to a third mirror. The third mirror reflects the light beam to the right rear projection lens. The right rear projection screen is on top of the part of the eyepiece in front of the right eye of the observer. The relay lens includes optical elements to produce a correct mapping function, to ensure that the image seen through the eyepiece is essentially free of geometric distortion.

In another embodiment, the image is transmitted by two fiber optic cables. In a further embodiment, two image sources feed respective fiber optic cables through respective relay lenses. The replica of the image seen through the eyepiece by the observer seems to originate at a distance. The replica of the image may be combined with the direct view of objects seen through the eyepiece, such that the observer views the real world as well as the displayed image simultaneously.

U.S. Pat. No. 5,162,828 to Furness et al entitled "Display system for a head mounted viewing transparency", is directed to a display system for conventional eyewear having a transparency that defines a field of view. The display system projects a magnified image of displayed information at a distance from the user, in the field of view defined by the transparency. The user may be, for example a skier or scuba diver, wearing conventional eyewear, such as goggles or a dive mask. The conventional eyewear has a frame that supports a transparency, such as a lens. The display system includes a Liquid Crystal Display (LCD) display and optics. The LCD display is mounted on the frame supporting the transparency. The optics is also mounted on the frame.

The LCD display displays information, preferably information relating to the activity for which the head mounted viewing transparency is worn. For example, the information may include the speed of a skier as sensed by a speed sensor. The optics includes a planar mirror and a collimating lens. The planar mirror is disposed in the periphery of the normal field of view defined by the transparency. The planar mirror receives the information and reflects the information to the collimating lens. The collimating lens collimates the light to project an image of the information depicted on the LCD display, so that the image appears located at a distance from the user when viewed from the planar mirror. Alternatively, the optics includes a toroidal mirror. The toroidal mirror receives the information from the LCD display and collimates the light, thereby projecting an enlarged image of the information in the periphery of the field of view. The mirror may be fully reflective. Alternatively, the mirror may be partially reflective, so as to superimpose the image of the displayed information on the scene viewed by the user through the transparency.

The LCD display includes a display plate, a backing plate, and a diffusing filter. The diffusing filter is exposed to ambient light, and provides an even illumination through the backing plate to the display plate, which is positioned adjacent to the diffusing filter. The display plate operates in transmissive mode, such that the portion of the display plate forming the characters is transparent, while the remainder of the display plate provides a dark background for the data characters. The ambient light diffused by the diffusing filter and transmitted to the display plate through the backing plate, illuminates the data characters to provide a contrast with the dark background. Alternatively, the display plate, the backing plate, and the diffusing filter may be replaced with active display elements, such as light emitting diodes.

The optical path defined by the relative position of the mirror, the LCD display, and the eyes of the user, may be made adjustable so that the display system can accommodate heads of various sizes. In one embodiment, the mirror is mounted on the transparency frame such that the position of the mirror is adjustable. In another embodiment, the position of the mirror is fixed, and the transparency frame includes adjustable temples to vary the optical path.

U.S. Pat. No. 4,867,551 to Perera entitled "Display projection optical system for spectacles or sunglasses", is directed to a miniature display projection system that superimposes images from an opto-electronic display panel on to the normal field of view of a spectacles or sunglasses wearer. The display projection system is mounted on the upper part of the rim of a spectacles or sunglasses frame, standing on the outer part of the eyepiece. The display projection system includes a housing and a projection window. The housing is seated on to the rim of the spectacles or sunglasses frame via a slot on the bottom length of the housing, and secured with a fixing screw. The housing includes micro-electronics, an opto-electronic display panel, and a watch battery. The projection window is fixed to the housing and protrudes downwards. The micro-electronics generate display information. The opto-electronic display panel produces visual images. The watch battery provides electrical power to the micro-electronics and the opto-electronic display panel.

The projection window is made of thin optically transparent material. The bottom end of the projection window is curved and slanting away from the eyepiece of the spectacles or sunglasses. The curved portion is referred to as the active portion of the projection window, and has the shape of an oblong sectional part of a parabolic surface. The concave side of the parabolic surface faces inward toward the eye of the wearer. In another embodiment, the projection window stands between the eye and the eyepiece of the spectacles or sunglasses.

The opto-electronic display panel may be of light emitting diode (LED) type or liquid crystal display (LCD) type. An LCD type display may include an active matrix technology display, enabling a television reception unit to be carried externally and connected to the display panel. The displayed may be, for example, time of day or television images. The surface of the opto-electronic display panel may be slanted for optimum projection angle. The opto-electronic display panel may be adjusted up or down inside the housing. The opto-electronic display panel display surface faces down and open to the outside of the housing. A micro switch activates the opto-electronic display panel, whenever the user wishes to view the display. Further micro switches coupled to the micro-electronics enable the presenting or selection of display information parameters and functions.

The active portion of the projection window intercepts light rays emanating from the surface of the opto-electronic display panel, and partially reflects the light, projecting the light parallel toward the eye of the spectacles or sunglasses wearer. Light from the normal field of view of the spectacles or sunglasses is transmitted through the thin transparent projection window with no distortion or obstruction. The wearer sees a virtual image of the display superimposed on the normal field of view, whenever the display is activated. When the display is not activated, the wearer does not see the projected display in the normal field of view.

U.S. Pat. No. 5,886,822 to Spitzer entitled "Image combining system for eyeglasses and face masks", is directed to an image combining lens system for integrating within eyeglasses or a facemask, that provides the optical functions of a head-mounted display system in a compact form. The image combining lens system includes an image source or display, a lens system, and an eyeglass frame or face mask.

The display and a first lens are mounted at the edge of the lens system, or main lens. The main lens is an optical system comprising embedded lenses and other optical components and surfaces, and includes an insert. For example, the main lens may be an eyeglass lens, with or without vision-correcting optical power. The insert comprises two materials having different indices of refraction. Light rays from the display travel via the first lens, through the material of higher refractive index of the insert, and are incident upon the interface between the two materials of the insert. The light rays from the display are totally internally reflected toward a third lens, positioned adjacent to the eye of the user. Ambient light rays travel through the material of lower refractive index of the insert, and are incident upon the interface, which refracts the ambient light rays away from the third lens. Alternatively, the insert comprises materials having thin-film interference coatings at the interface, and the interface serves to combine the display light and the ambient light. The first lens and third lens are selected such that the combined optical power forms a microscope, allowing the image from the display to be viewed with a desired magnification.

The display may be located remote from the main lens, using an image relay, such as a coherent optical fibre bundle or a gradient index lens image conduit, to relay the display image to the main lens. For example, the display may be located behind the head of the user. In another embodiment, the insert comprises a cube beam splitter, which is used as a combiner, instead of an interface having a totally internally reflecting surface. The cube beam splitter does not refract the ambient rays. The cube beam splitter reflects approximately 50% of the ambient light and display light to the eye of the user. However, a polarizing beam splitter, used together with a display that provides polarized light, allows higher reflection percentages to be obtained. A housing holds two glass plates that are joined to the cube beam splitter. The main lens includes the glass plates, the cube beam splitter, and other internal parts, such as two optional polarizing layers. Ambient light rays pass through the main lens to the eye of the user via three possible paths, allowing for adjustment of the light level from the ambient scene reaching the eye, thereby balancing the light level between the display and the ambient scenery.

The image combining lens system may be designed as a see-through system (in which the display image is combined with the ambient image so that the user can see both images), see-around system (in which the display image occludes part of the ambient image), or full-immersion system (in which the entire ambient image is blocked so that the user sees only the display image). For example, an insert having interference coatings at the interface may be used for a see-through system, whereas an interface that provides total internal reflection may be used for a see-around system. Alternatively, the field of view of the insert may be increased and the main lens may be provided with an opaque cover, to form a full-immersion system.

U.S. Pat. No. 6,204,974 to Spitzer entitled "Compact image display system for eyeglasses or other head-borne frames", is directed to a head-borne image display system that combines an image relay system and mechanical support with a mounting system that can be applied to eyewear or other head gear. The display system includes a support frame and a display assembly. The support frame is configured to be supported by the head of a user. The support frame supports the display assembly in front of the eye of the user. The display assembly includes a display element, an optical relay, and an eyepiece assembly. An optical pathway is located internally within the optical relay, to receive light from the display element. The optical relay is at least partially transparent to ambient light.

The display element provides a display image to the eyepiece assembly, passing through at least a portion of the optical pathway. Ambient light passes through two optical surfaces of the optical relay, toward the eye of the user. The eyepiece assembly is located within the optical relay, and has a partially or fully reflecting surface, which relays the display light out of the optical relay and toward the eye of the user. The display system may be a see-through system, so that the user sees a superposition of the display image and the ambient image. The optical relay and eyepiece assembly may include a combining element having, for example, totally internally reflecting surfaces, partially silvered mirrors or dielectric coatings, or holographic or diffractive surfaces with optical surfaces for vergence correction.

The display element may be mounted to a head-borne frame, such as an eyeglass frame, a face mask frame, or a head set, for example via a boom. The display assembly elements may be embedded within an eyeglass frame or lens. The display element may be added to or removed from the head-borne frame with little discomfort to the user. The display element may be located remote from the eyeglass lens, using an image relay, such as a coherent optical fibre bundle or a gradient index lens image conduit, to relay the display image to the main lens. The display element may be adjustable, allowing the user to position the display image in a convenient location within the field of view of the user.

The display system may include a housing assembly having a mounting mechanism, which can be mounted, in a removable manner, to the head-borne frame of the eyewear at a location outside the field of view of the user. The housing assembly may have circuitry to receive data or video signals. The housing assembly supports the display element, such as an electronic imaging assembly, outside the field of view of the user. The imaging assembly communicates with the circuitry in the housing assembly to produce an image.

U.S. Pat. No. 6,392,811 to Lindau entitled "Arrangement for a wearable optomechanical deflector for a display unit", is directed to an optomechanical deflector for a line display unit, which has ocular and objective functions and components for sweep generation and image turning. The deflector includes a tilting plane mirror, a rigid cylindrical mirror or lens, and a concave mirror. The tilting mirror surface and rigid cylindrical mirror surface forms part of the objective function of the deflector. The concave mirror surface forms part of the ocular function of the deflector.

The tilting mirror receives incoming radiation from a line display unit, and reflects the radiation toward the rigid cylindrical mirror. The frequency of the tilting mirror is related to the line deflection function of the line display unit. The rigid cylindrical mirror surface reflects the received radiation toward the concave mirror. The concave mirror reflects the received radiation toward an eye of a viewer. The concave mirror surface reproduces the tilting mirror surface in the pupil of the eye of the viewer.

The objective function of the deflector is positioned at a distance from the ocular function, so that the deflector has an afocal optical system. The tilting mirror, which performs sweep generation, may also be arranged to perform image turning, so that an image turned appropriately is directed upon the pupil of the eye of the viewer. The tilting mirror may be arranged in front of the forehead of the viewer. The tiling mirror may be positioned upwards, downwards, or toward the side. In another embodiment, the tilting mirror and the rigid cylindrical mirror have changed places. The concave mirror may be replaced with a partly transparent mirror, enabling the viewer to view the surroundings and the image from the line display unit simultaneously.

U.S. Pat. No. 6,618,099 to Spitzer entitled "Display device with eyepiece assembly and display on opto-mechanical support", is directed to a head-mounted display system with a transparent support fixture that suspends a display and an eyepiece near the eye of a user. The display system includes a display, a clear mechanical support fixture, and an eyepiece assembly. The eyepiece assembly includes a prism and a lens. The eyepiece assembly is positioned at one end of the support fixture. The display is positioned between the prism and the support fixture.

A light source transmits light through the support fixture, and incident on the back side of the display. The display modulates the light to form an image, and relays the image to the eye of an observer via the prism and the lens. The lens magnifies the image from the display, for convenient viewing. The observer also sees images from the ambient scene images, which pass through the support fixture, directly toward the eye of the observer.

The support fixture is elongated. The image from the display passes through the support fixture along the direction of elongation, while the image from the ambient scene passes through a clear side surface of the support fixture across the direction of elongation. The display is, for example, a transmissive LCD. In other embodiments, a reflective display or an emissive display may be used. The eyepiece assembly may also include a polarization beam-splitter coating, a quarter-wave plate, and a focusing mirror, for collimating polarized light from the light source. In another embodiment, the support fixture is hollow, or has a thin plate shape, and conveys light from the light source to the display in free space along a straight path. The display system may further include a housing containing circuitry for electrical communication with the display and the light source. The display system may be mounted in front of one eye of the observer, via a fixture mounted to a spectacle frame or headband. A second display system may be used for viewing by both eyes of the observer. The display system may be provided with an ear piece and a microphone, to interface with a cellular telephone, computer, or personal digital assistant.

SUMMARY OF THE DISCLOSED TECHNIQUE

It is an object of the disclosed technique to provide a novel head-mounted see-through near eye display system.

In accordance with the disclosed technique, there is thus provided a near eye image display system. The display system includes an image projector, a beam combiner assembly, and an optical assembly. The optical assembly is optically coupled between the image projector and the beam combiner assembly. The image projector projects a display image toward an optical pathway. The optical pathway intersects the viewing axis, which extends from the eye of a user to an ambient scene. The beam combiner assembly includes a plurality of beam combiners optically cascaded along the optical pathway. Each of the beam combiners is disposed diagonally to the optical pathway and diagonally to the viewing axis. Each of the beam combiners is arranged such that for each two adjacent beam combiners, the first of the adjacent beam combiners being optically located between the second of the adjacent beam combiners and the image projector, the geometrical projection of the second beam combiner onto a first plane perpendicular to the optical pathway, is subsumed within the geometrical projection of the first beam combiner onto the first plane. Each of the beam combiners is further arranged such that the partial geometric projection of each of the beam combiners onto a second plane perpendicular to the viewing axis forms a continuous geometric projection. The optical assembly directs display light of the display image from the image projector toward the beam combiner assembly along the optical pathway. Each of the beam combiners reflects the display light toward the eye, and further directs ambient light emerging from the ambient scene toward the eye, thereby superimposing the display image onto the ambient scene.

The display system further includes a double prism assembly, optically coupled between the image projector and the optical assembly. The double prism assembly directs the display light toward the optical assembly along the optical pathway. The double prism assembly includes a first prism and a second prism, each having at least a first surface, a second surface and a third surface, which are geometrically extendable to form a triangle. The first prism and second prism are made of transparent material. The first surface of the first prism is coupled to the image projector. The first prism receives the display light from the image projector at a substantially perpendicular direction to the first surface of the first prism. The first surface of the second prism is coupled to the optical assembly. The second prism, directs the display light toward the optical assembly at a substantially perpendicular direction to the first surface of the second prism. For each of the first prism and second prism, the angle between the third surface and the first surface is substantially 67°30'

$$\left(\frac{3\pi}{8}\right),$$

the angle between the third surface and the second surface is substantially 67°30'

$$\left(\frac{3\pi}{8}\right),$$

and the angle between the first surface and the second surface substantially 45°

$$\left(\frac{\pi}{4}\right).$$

The second surface of the first prism is disposed adjacent to the second surface of the second prism, with a transparent medium there between. The ratio between the refractive index of the transparent material and the refractive index of the transparent medium is such that it produces total internal reflection on the first surface and on the second surface of each prism, substantially at an angle of incidence of 45 degrees. For each of the first prism and second prism, the third surface is optically reflective, providing total internal reflection.

In accordance with another aspect of the disclosed technique, there is thus provided a near eye image display system, including an image projector, projecting a display image toward an optical pathway, the optical pathway intersecting a viewing axis, the viewing axis extending from the eye of a user to an ambient scene. The system also includes a beam combiner assembly comprising a plurality of beam combiners, the beam combiners optically cascaded along the optical pathway, each of the beam combiners are disposed diagonally to the optical pathway and diagonally to the viewing axis. Each of the beam combiners are arranged such that for each two adjacent the beam combiners, the first of the adjacent beam combiners is optically located between the second of the adjacent beam combiners and the image projector, the geometrical projection of the second beam combiner onto a first plane being perpendicular to the optical pathway, is subsumed within the geometrical projection of the first beam combiner onto the first plane. Each of the beam combiners is further arranged such that the partial geometric projection of each of the beam combiners onto a second plane being perpendicular to the viewing axis, forms a continuous geometric projection. The system further includes an optical assembly, optically coupled between the image projector and the beam combiner assembly, the optical assembly directs display light of the display image from the image projector toward the beam combiner assembly along the optical pathway.

The system also includes a prism, optically coupled between the image projector and the optical assembly, the prism having at least a first surface, a second surface and a third surface, wherein the first surface, the second surface and the third surface are geometrically extendable to form a triangle, the prism being made of transparent material. The angle between the third surface and the first surface is substantially 67°30'

$$\left(\frac{3\pi}{8}\right),$$

the angle between the third surface and the second surface is substantially 67°30'

$$\left(\frac{3\pi}{8}\right),$$

and the angle between the first surface and the second surface substantially 45°

$$\left(\frac{\pi}{4}\right).$$

The third surface is optically reflective, providing total internal reflection, the first surface of the prism is coupled to the image projector, the prism receiving the display light from the image projector, at a substantially perpendicular direction to the first surface of the prism. The second surface of the prism is coupled to the optical assembly, the display light is totally internally reflected by the second surface of the prism toward the third surface of the prism, the display light is totally internally reflected by the third surface of the prism toward the first surface of the prism, the display light is totally internally reflected by the first surface of the prism toward the second surface of the prism at a substantially perpendicular direction to the second surface of the prism, the prism directing the display light toward the optical assembly, at a substantially perpendicular direction to the second surface of the prism.

BRIEF DESCRIPTION OF THE DRAWINGS

The disclosed technique will be understood and appreciated more fully from the following detailed description taken in conjunction with the drawings in which.

DETAILED DESCRIPTION OF THE EMBODIMENTS

The disclosed technique overcomes the disadvantages of the prior art by providing a near eye display system with an eyepiece having a beam combiner assembly, which includes a plurality of beam combiners optically cascaded to provide a large display field of view. This unique arrangement yields a compact eyepiece with small physical dimensions, compared with the eyepiece of a conventional display system having the same field of view.

Figure 3:
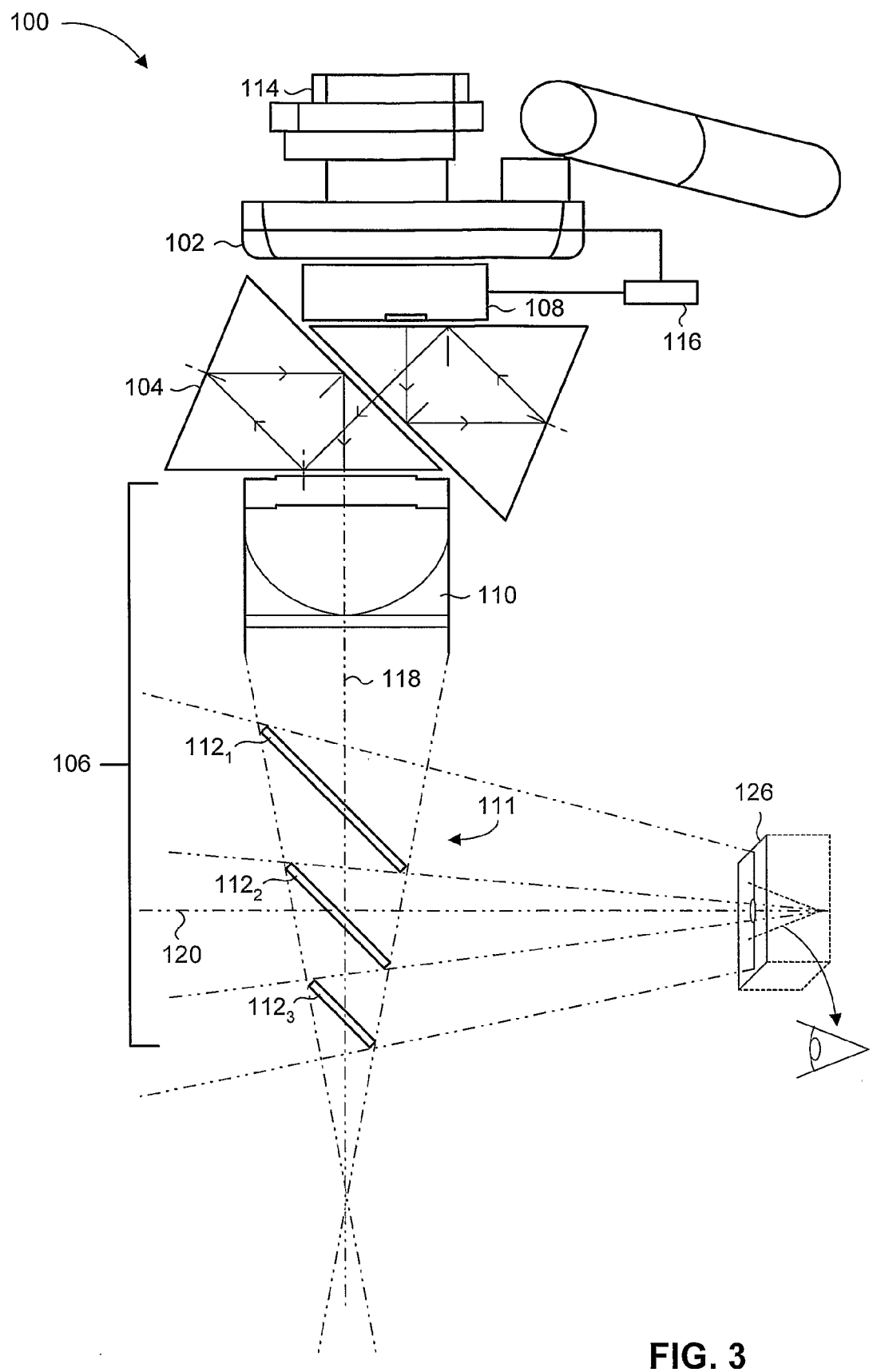
FIG. 3 is a schematic illustration in a side view of a display system, constructed and operative in accordance with an embodiment of the disclosed technique.
Figure 4:
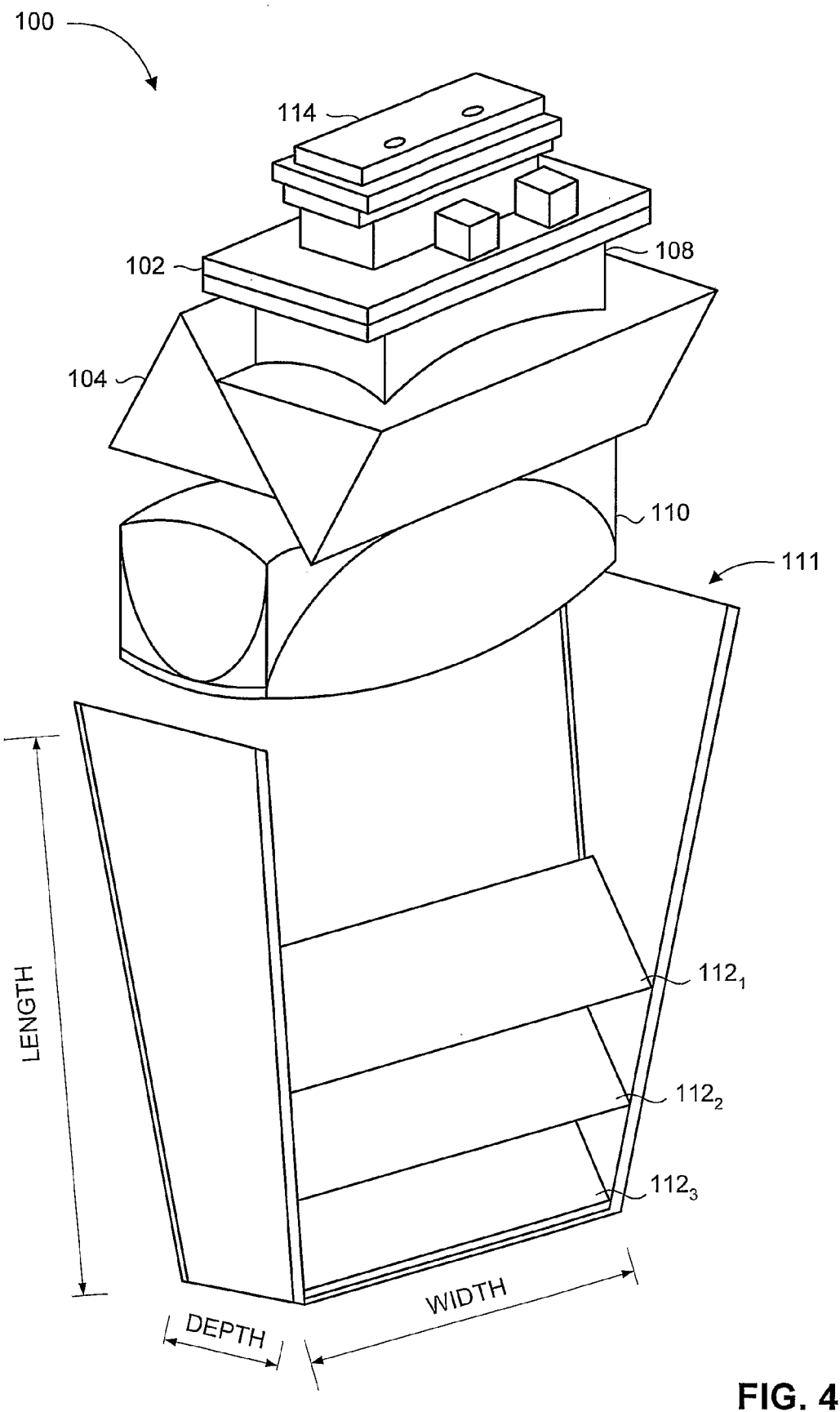
FIG. 4 is a perspective view of the display system of FIG. 3.

Reference is now made to FIGS. 3 and 4. FIG. 3 is a schematic illustration in a side view of a display system, generally referenced 100, constructed and operative in accordance with an embodiment of the disclosed technique. FIG. 4 is a perspective view of the display system of FIG. 3.

Display system 100 includes an image projector 102, a double prism assembly 104, an eyepiece 106, a field flattener 108, an electronic interface 114, and a focus adjustment mechanism 116. Eyepiece 106 includes an optical assembly 110 and a beam combiner assembly 111 having plurality of beam combiners $112_1$, $112_2$, and $112_3$. Image projector 102 is optically coupled with field flattener 108. Double prism assembly 104 is optically coupled between image projector 102 and optical assembly 110. Optical assembly 110 is further optically coupled with beam combiner assembly 111. Electronic interface 114 is coupled with image projector 102. Focus adjustment mechanism 116 is coupled with image projector 102 and with field flattener 108.

Image projector 102 projects a display image. Field flattener 108 flattens the image plane of the projected display image, to compensate for field curvature. Double prism assembly 104 directs light projected from the image projector 102 (i.e., display light) along an optical pathway 118 toward optical assembly 110. Optical assembly 110 directs the display light toward beam combiner assembly 111 along optical pathway 118. Beam combiners $112_1$, $112_2$, and $112_3$ reflect the display light toward the eye of a user. Beam combiners $112_1$, $112_2$, and $112_3$ further receive light from an ambient scene (i.e., ambient light) and direct the ambient light toward the eye of the user. The user thereby views the display image superimposed onto the ambient scene.

Beam combiners $112_1$, $112_2$, and $112_3$ are semi-transparent, allowing ambient light to pass through from the direction parallel to the viewing axis 120 of the user, while reflecting display light arriving from the direction perpendicular to viewing axis 120. Viewing axis 120 defines a horizontal axis extending from the eye of the user to the ambient scene. Viewing axis 120 is substantially perpendicular to optical pathway 118. Optical assembly 110 may include a single lens or a plurality of lenses. Optical assembly 110 may also include other types of optical elements (e.g., convex or concave mirrors, prisms, and the like), and may be extended in length along optical pathway 118 (e.g., replacing double prism assembly 104).

Image projector 102 may be any display element capable of projecting an image to be displayed. For example, image projector 102 may be a transmissive display, in which the display element modulates a light source, such as a transmissive Liquid Crystal Display (LCD) based display. Alternatively, image projector 102 may be a reflective display, in which the display element uses a mirrored surface to reflect the display light to the viewer, such as a reflective LCD or digital micro-mirror device (DMD). Further alternatively, image projector 102 may be an emissive display, in which a flat-panel display uses electrical excitation of chemicals, such as an Organic Light Emitting Diode (OLED) display. Another example of an emissive display is a laser scanning based image projector, such as laser diodes scanned with a micromechanical mirror. Image projector 102 typically receives an image representation from an external source (i.e., logic or visual) and projects an image in accordance with the image representation. Image projector 102 may use any type of graphics standard, for example the Super Video Graphics Array (SVGA) graphics standard. Image projector 102 may display images in a stroke format, raster format, mixed stroke and raster format, and the like. The display image projected by image projector 102 has a high resolution. For example, the form factor of image projector 102 is greater than 12 mm, and the pixel size of the projected display image is approximately 8-20 µm. The display image projected by image projector 102 may be electronically pre-distorted, in accordance with the optical properties of display system 100.

Focus adjustment mechanism 116 adjusts the focus of the display image projected by image projector 102, so that the user views the display image in focus with respect to the scene of interest being viewed simultaneously (e.g., the ambient scene). For example, focus adjustment mechanism 116 adjusts the focus of the display image so that the display image appears at optical infinity, while the user is viewing an ambient scene that is substantially far away. Alternatively, focus adjustment mechanism 116 adjusts the focus of the display image so the display image appears nearby, while the user is viewing an ambient scene that is substantially near the user.

Focus adjustment mechanism 116 may adjust the focus by mechanically repositioning or otherwise fine-tuning elements of display system 100. For example, focus adjustment mechanism 116 alters the distance between image projector 102 and field flattener 108. Focus adjustment mechanism 116 may be realized in a variety of implementations, such as a dial, wheel, knob, and the like, and may be located in various possible positions on display system 100. Adjustment of the focal length may be used to compensate for the diopter setting of eyeglasses. Electronic interface 114 interfaces between display system 100 and electronic components located externally to display system 100 (e.g., a power supply, a display driver, and the like).

Double prism assembly 104 substantially reduces the actual distance between image projector 102 and eyepiece 106. Double prism assembly 104 enables display system 100 to be compact and light without compromising the resolution of the display image projected by image projector 102. Double prism assembly 104 serves to "fold" the light rays from the display image, reflecting the light rays within the prisms in a controlled manner to maintain the required focal length of display system 100, while reducing the actual physical distance between image projector 102 and eyepiece 106. It is noted that the focal length of display system 100 is determined in the design stage according to several parameters, such as the display format (i.e., display size) of image projector 102, and the desired display image size (i.e., field of view of display system 100 to be presented to the eye of the user).

Figure 5:
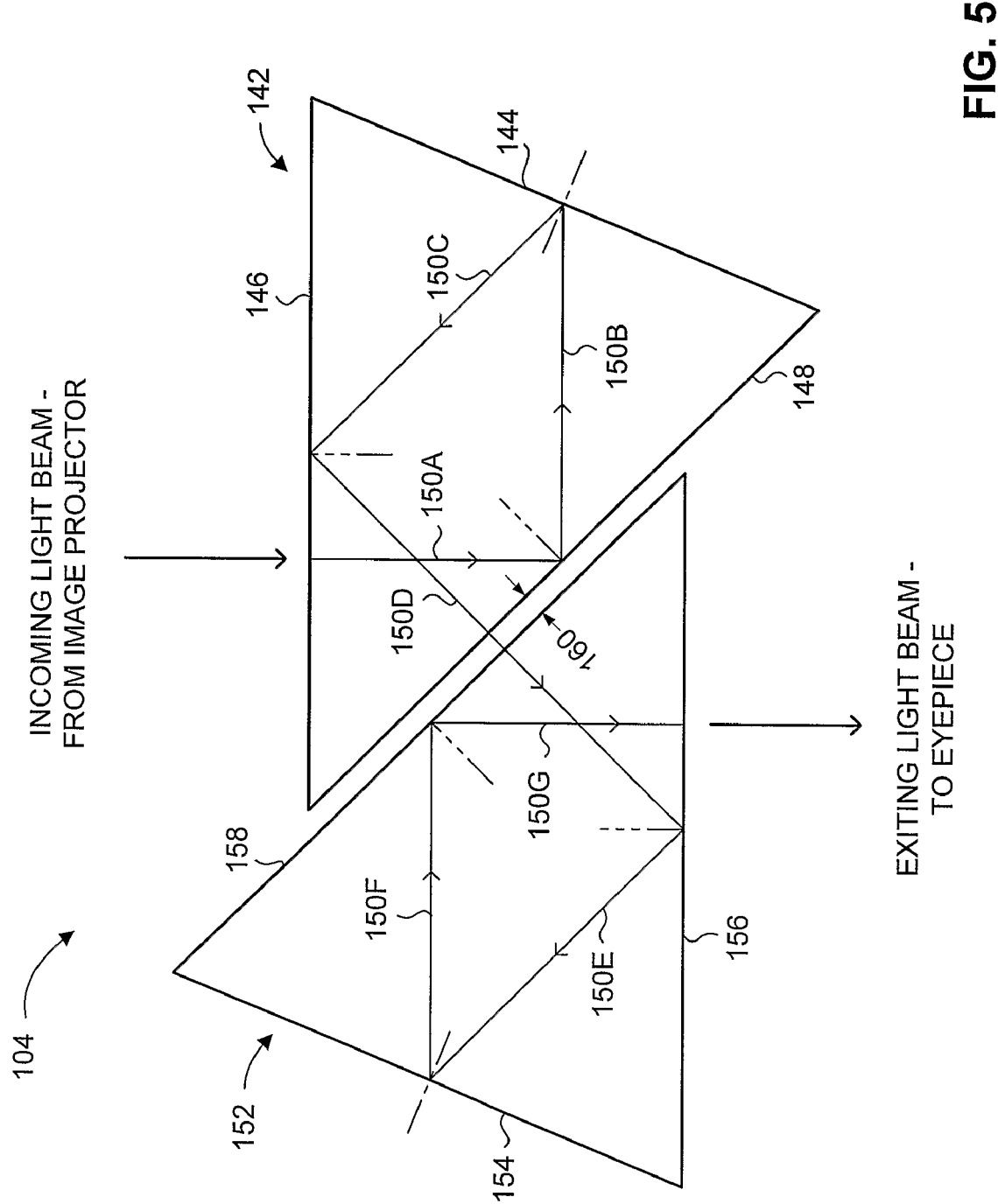
FIG. 5 is an exploded view of the double prism assembly of FIG. 3.

Reference is now made to FIG. 5, which is an exploded view of the double prism assembly of FIG. 3. Double prism assembly 104 includes a pair of prisms, generally referenced 142 and 152. Prisms 142 and 152 are made of a transparent material. First prism 142 includes a first surface 146, a second surface 148, and a third surface 144. Second prism 152 includes a first surface 156, a second surface 158, and a third surface 154. For each of first prism 142 and second prism 152, the three surfaces thereof are geometrically extendable to form a triangle. The sides of surfaces 146 and 148 of first prism 142 are equal in length, and define an angle of substantially 45°

$$\left(\frac{\pi}{4}\right)$$

there between (i.e., the angle may vary a few degrees from 45°). Similarly, the sides of surfaces 156 and 158 of second prism 152 are equal in length, and the angle between the two sides is substantially 45°

$$\left(\frac{\pi}{4}\right)$$

(i.e., the angle may vary a few degrees from 45°). The sides of surfaces 144 and 146, and the sides of surfaces 144 and 148 of first prism 142, each define an angle of substantially 67°30'

$$\left(\frac{3\pi}{8}\right)$$

there between (i.e., the angle may vary a few degrees from 67°30'). Similarly, the sides of surfaces 154 and 156, and the sides of surfaces 154 and 158 of second prism 152, each define an angle of substantially 67°30'

$$\left(\frac{3\pi}{8}\right)$$

there between (i.e., the angle may vary a few degrees from 67°30').

In one embodiment of the disclosed technique, the sides of surfaces 146 and 148 of first prism 142 are equal in length, and define an angle of 44° there between. The sides of surfaces 144 and 146, and the sides of surfaces 144 and 148 of first prism 142, each define an angle of 68° there between. The sides of surfaces 156 and 158 of second prism 152 are equal in length, and define an angle of 44° there between. The sides of surfaces 154 and 156, and the sides of surfaces 154 and 158 of second prism 152, each define an angle of 68° there between.

Surfaces 144 and 154 are each optically reflective, to ensure total internal reflection of the light. The reflectivity of surfaces 144 and 154 can be achieved by a reflective coating (e.g. silver coating, aluminum coating, and the like). Alternatively, a reflective medium (e.g., a mirror) may be positioned adjacent to each of surfaces 144 and 154.

Surface 146 of first prism 142 receives incoming light from a display image from image projector 102, at a substantially perpendicular direction to surface 146. The incoming light beam traverses path 150A and is incident upon surface 148, upon which the light beam is internally reflected along path 150B toward surface 144. Surface 144 internally reflects the light beam toward surface 146 along path 150C. Subsequently, surface 146 of first prism 142 internally reflects the light beam along path 150D toward second prism 152. The light beam is incident upon surface 156, which internally reflects the light beam toward surface 154 along path 150E. Surface 154 then internally reflects the light beam toward surface 158 along path 150F. Finally, surface 158 internally reflects the light beam along path 150G toward surface 156, upon which the light beam exits double prism assembly 104, at a substantially perpendicular direction to surface 156, toward eyepiece 106. It is noted that there is an infinitesimal spacing or gap between first prism 142 and second prism 152, denoted gap 160 in FIG. 3. Gap 160 must be larger than the size of the smallest wavelength in the display image, to ensure that light beams 150A and 150F undergo total internal reflection. Alternatively, there is a transparent medium between first prism 142 and second prism 152. The ratio between the transparent medium between the two prisms, and the transparent material of which the two prisms are made, must be such that light beams 150A and 150F undergo total internal reflection (from surface 146 of first prism 142, and surface 158 of second prism 152, respectively). The display light undergoes a total of six reflections within double prism assembly 104.

In an alternative embodiment of the disclosed technique, display system 100 does not include double prism assembly 104, and optical assembly 110 is extended in length along optical pathway 118. In this embodiment, image projector 102 projects the display image directly toward optical assembly 110.

Figure 6:
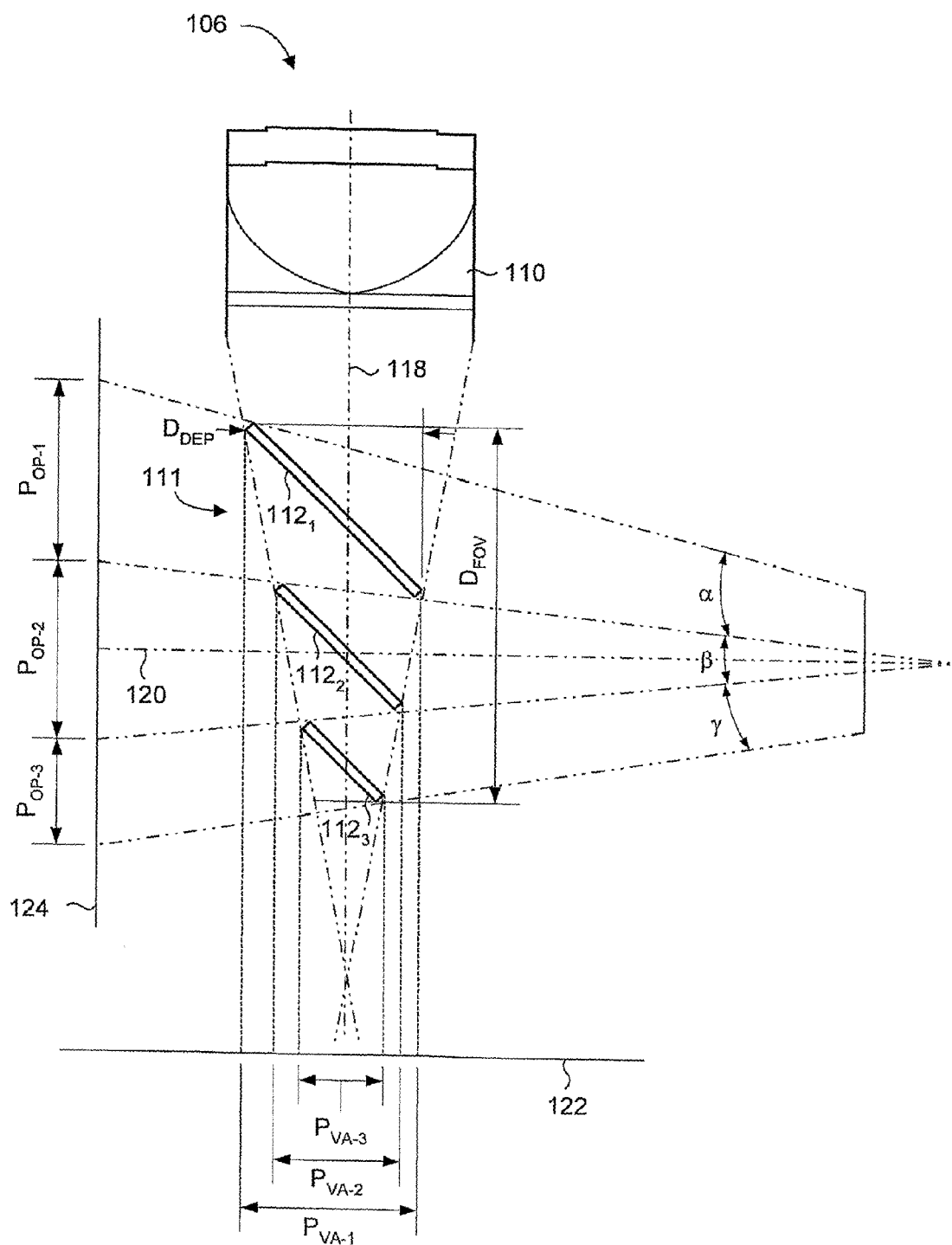
FIG. 6 is an exploded view of the beam combiner assembly of FIG. 3.

Reference is now made to FIG. 6, which is an exploded view of the beam combiner assembly of FIG. 3. Optical assembly 110 directs the display light toward beam combiner assembly 111 along optical pathway 118. The display light is incident upon first beam combiner $112_1$. First beam combiner $112_1$ partially reflects the received display light toward the eye of the user, along field of view α, and transmits the non-reflected display light toward second beam combiner $112_2$. Second beam combiner $112_2$ partially reflects the received display light toward the eye, along field of view β, and transmits the non-reflected display light toward third beam combiner $112_3$. Third beam combiner $112_3$ partially reflects the received display light toward the eye, along field of view γ, and transmits the non-reflected display light to either a further beam combiner, or to the housing of display system 100, which absorbs the rest of the light.

Beam combiners $112_1$, $112_2$, and $112_3$ are cascaded vertically along optical pathway 118. Each of beam combiners $112_1$, $112_2$, and $112_3$ is arranged diagonally to optical pathway 118, generally parallel with one another. Each of beam combiners $112_1$, $112_2$, and $112_3$ is further arranged diagonally to viewing axis 120. Each of beam combiners $112_1$, $112_2$, and $112_3$ is arranged at substantially the same angle, with respect to viewing axis 120. The first beam combiner $112_1$ is disposed along optical pathway 118, below optical assembly 110. The second beam combiner $112_2$ is disposed along optical pathway 118, below first beam combiner $112_1$. Second beam combiner $112_2$ is disposed such that there is no gap between the field of view α of the user of reflected light obtained from first beam combiner $112_1$, and the field of view β of the user of reflected light obtained from second beam combiner $112_2$. The third beam combiner $112_3$ is disposed along optical pathway 118, below second beam combiner $112_2$. Third beam combiner $112_3$ is disposed such that there is no gap between the field of view β of the user of reflected light obtained from second beam combiner $112_2$, and the field of view γ of the user of reflected light obtained from third beam combiner $112_3$.

The geometric projection of a given beam combiner onto plane 122 (i.e., an arbitrary plane that is perpendicular to optical pathway 118), is subsumed within the geometric projection onto plane 122 of the beam combiner above (i.e., closer to optical assembly 110). In particular, the geometric projection onto plane 122 of third beam combiner $112_3$, denoted $P_{VA\text{-}3}$, is subsumed within the geometric projection onto plane 122 of second beam combiner $112_2$, denoted $P_{VA\text{-}2}$. Similarly, the geometric projection onto plane 122 of second beam combiner $112_2$, denoted $P_{VA\text{-}2}$, is subsumed within the geometric projection onto plane 122 of first beam combiner $112_1$, denoted $P_{VA\text{-}1}$.

The partial geometric projection of each of the beam combiners onto plane 124 (i.e., an arbitrary plane that is perpendicular to viewing axis 120) forms a continuous geometric projection. In particular, the partial geometric projection onto plane 124 of first beam combiner $112_1$, denoted $P_{OP\text{-}1}$, is directly adjacent to, but not necessarily overlapping with, the partial geometric projection onto plane 124 of second beam combiner $112_2$, denoted $P_{OP\text{-}2}$. Similarly, the partial geometric projection onto plane 124 of second beam combiner $112_2$, denoted $P_{OP\text{-}2}$, is directly adjacent to, but not necessarily overlapping with, the partial geometric projection onto plane 124 of third beam combiner $112_3$, denoted $P_{OP\text{-}1}$.

Figure 2:
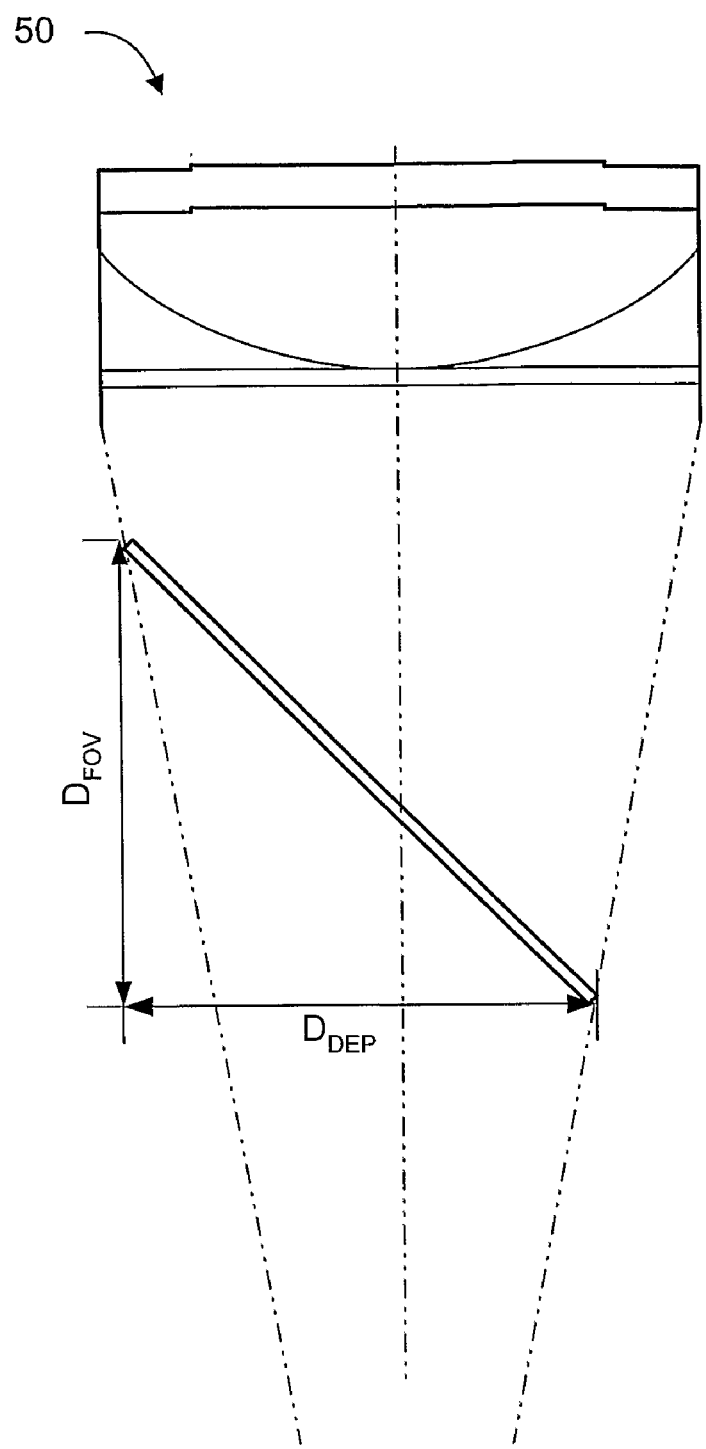
FIG. 2 is a schematic illustration of a single beam combiner eyepiece, which is known in the art.

It is noted that plurality of beam combiners $112_1$, $112_2$, and $112_3$ substantially extends the overall field of view of display system 100. Beam combiners $112_1$, $112_2$, and $112_3$ enables display system 100 to provide a given field of view at a reduced depth dimension of eyepiece 106. With reference back to FIG. 2, it is noted that the field of view provided by eyepiece 106 is identical to the field of view provided by eyepiece 50 (denoted $D_{FOV}$ in both Figures). However, the depth of eyepiece 106 is significantly smaller than the depth of eyepiece 50 (denoted $D_{DEP}$ in both Figures), where in each case, the depth is measured in terms of the depth of the largest beam combiner in the eyepiece (which is equivalent to $P_{VA-1}$ in eyepiece 106).

Referring back to FIG. 3, the eye of the user must be within eye motion box 126, in order for the user to properly view the full display image. If the eye of the user moves outside of eye motion box 126, then at least some information from the display image may not be seen, or there may be a reduction in the brightness level of certain parts of the display image. Each of beam combiners $112_1$, $112_2$, and $112_3$ reflects a partial sector of the display image directed from image projector 102. These partial sectors combine together to form a complete display image only when the eye of the user is located within eye motion box 126. If the eye of the user is located outside of eye motion box 126, then the partial sectors reflected by the beam combiners will combine to form only a portion of the complete display image, as viewed by the user.

Figure 7:
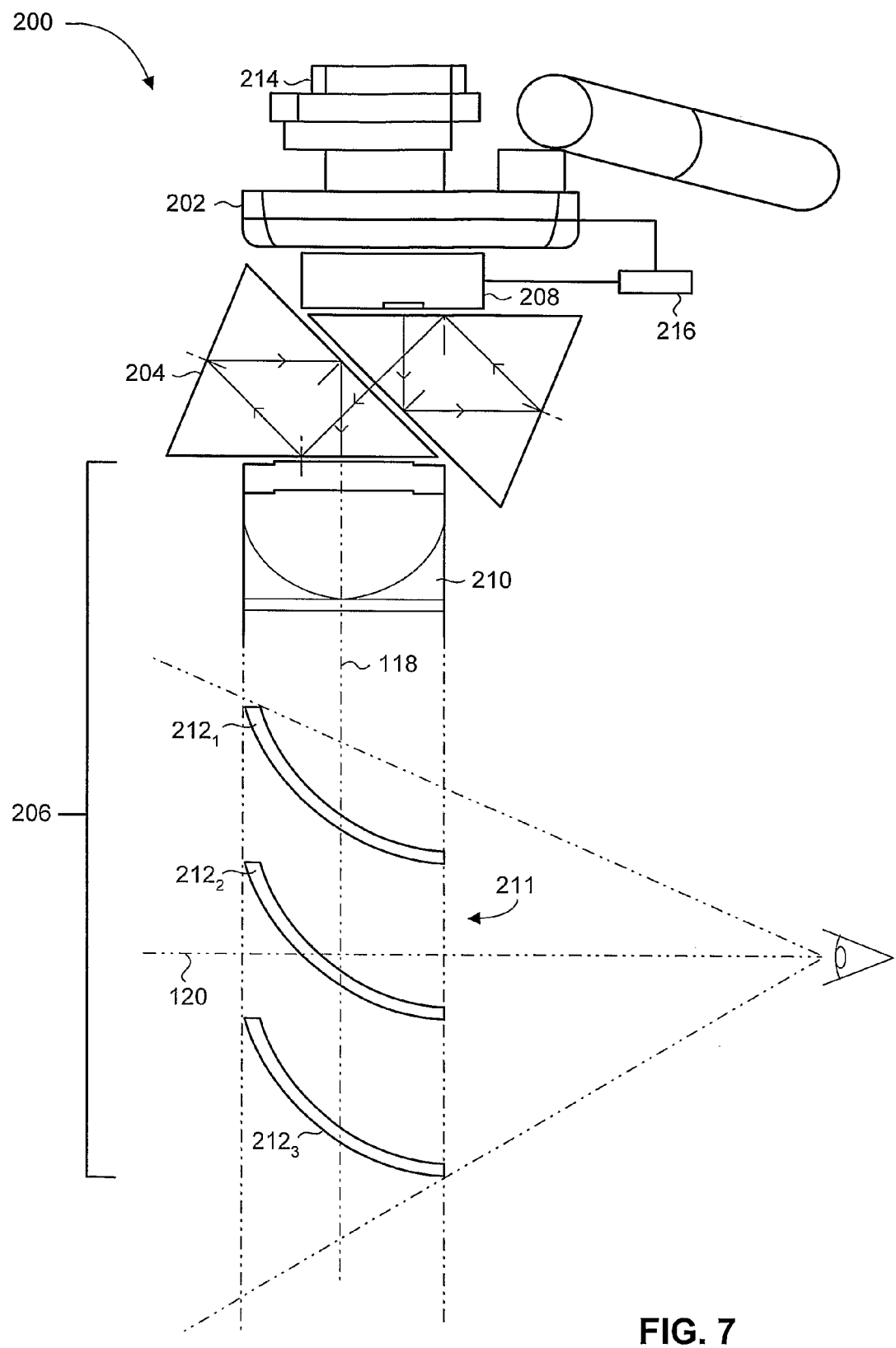
FIG. 7 is a schematic illustration in a side view of a display system having curved beam combiners, constructed and operative in accordance with another embodiment of the disclosed technique.

The shape of beam combiners $112_1$, $112_2$, and $112_3$ may be straight or curved along the length. Reference is now made to FIG. 7, which a schematic illustration in a side view of a display system having curved beam combiners, generally referenced 200, constructed and operative in accordance with another embodiment of the disclosed technique. Display system 200 includes an image projector 202, a double prism assembly 204, an eyepiece 206, a field flattener 208, an electronic interface 214, and a focus adjustment mechanism 216. Eyepiece 206 includes an optical assembly 210 and a beam combiner assembly 211 having plurality of beam combiners $212_1$, $212_2$, and $212_3$. Display system 200 is analogous to display system 100 with reference to FIG. 3, with the exception that beam combiner assembly 211 of display system 200 is made up of curved beam combiners $212_1$, $212_2$, and $212_3$, as opposed to the straight beam combiners $112_1$, $112_2$, and $112_3$ of display system 100. It is noted that straight beam combiners $112_1$, $112_2$, and $112_3$ provide simplified manufacturability of beam combiner assembly 111, whereas curved beam combiners $212_1$, $212_2$, and $212_3$ may provide yet a further reduction in the depth dimension of eyepiece 206.

It is noted that by changing the refractive index of the prisms of double prism assembly 204, the size of the prisms may be reduced, thereby making display system 200 even more compact. Generally, the size of the prisms of double prism assembly 204 is selected in accordance with the display format (i.e., display size) of image projector 202, the format of the exit path to beam combiners $212_1$, $212_2$, and $212_3$, and the focal length of display system 200. The focal length of display system 200 is (among other factors) also dependent on the refractive index of the prism material in double prism assembly 204. Therefore, by using a different material with a different refractive index, it is possible to vary the size of the prisms in double prism assembly 204, while maintaining the required focal length of display system 200.

Referring back to FIG. 3, beam combiners $112_1$, $112_2$, and $112_3$ may also be holographic. In such a case, holographic beam combiners $112_1$, $112_2$, and $112_3$ may be arranged at a wide range of possible angles with respect to viewing axis 120 (i.e., not necessarily at a 45° angle), thereby further reducing the volume of eyepiece 106. Furthermore, holographic beam combiners $112_1$, $112_2$, and $112_3$ may be operative to pass through (or reflect) only certain wavelengths of light emitted by image projector 102. Beam combiners $112_1$, $112_2$, and $112_3$ may also be polarized. Polarizing beam combiners $112_1$, $112_2$, and $112_3$ may be used as an analyzer for an image projector 102 that generates polarized light (e.g., an LCD display), passing through only one type of polarization, and not other types of polarization. The precise amount of display light and ambient light reflected by the polarizing beam combiners $112_1$, $112_2$, and $112_3$ may be adjusted, thus improving the contrast ratio of the combined scene viewed by the user. In addition, each of beam combiners $112_1$, $112_2$, and $112_3$ may have different levels of transmittance or reflectance, allowing for adjustment of the ratio between the amount of display light and ambient light reaching the eye of the user.

In an alternative embodiment of the disclosed technique, viewing axis 120 is at an angle with respect to optical pathway 118. As a result, the user views the image projected by image projector 102 off-axis (i.e., at an angle).

Figure 8:
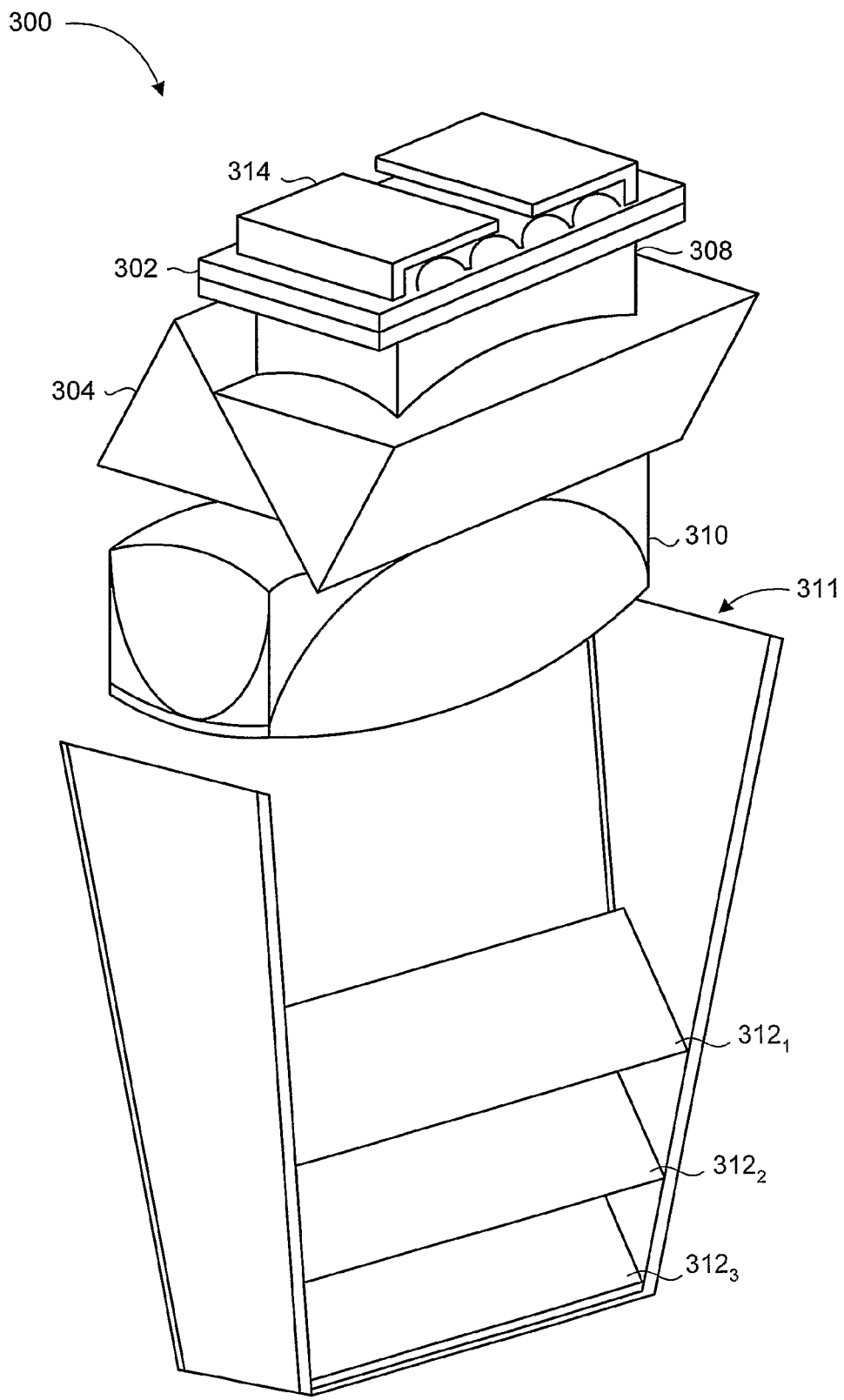
FIG. 8 is a schematic illustration in perspective view of a display system including an electromechanical attachment mechanism, constructed and operative in accordance with a further embodiment of the disclosed technique.

Display system 100 may also incorporate a mechanism to attach and detach display system 100 to an external device, and to simultaneously serve as an interface to external electronic components. Reference is now made to FIG. 8, which a schematic illustration in perspective view of a display system including an electromechanical attachment mechanism, generally referenced 300, constructed and operative in accordance with a further embodiment of the disclosed technique. Display system 300 includes an image projector 302, a double prism assembly 304, an eyepiece 306, a field flattener 308, an electromechanical attachment mechanism 314, and a focus adjustment mechanism 316. Eyepiece 306 includes an optical assembly 310 and a beam combiner assembly 311 having plurality of beam combiners $312_1$, $312_2$, and $312_3$. Display system 300 is analogous to display system 100 with reference to FIG. 3, with the exception that electromechanical attachment mechanism 314 of display system 300 replaces electronic interface 114 of display system 100. Display system 300 may be mounted, via electromechanical attachment mechanism 314, onto conventional eyewear or head gear, such as eyeglasses, spectacles, goggles, a mask, a helmet, and the like. Thus, electromechanical attachment mechanism 314 allows display system 300 to become a modular device. Electromechanical attachment mechanism 314 may also serve as an interface between display system 300 and electronic components located externally to display system 300 (e.g., a power supply, a display driver, and the like). For example, display system 300 may attach or detach with electronic contacts of external components, by sliding the contacts in or out of electromechanical attachment mechanism 314, respectively. Alternatively, instead of electromechanical attachment mechanism 314, display system 300 may include an attachment mechanism that involves a different form of interfacing, such as optical, wireless, and the like (e.g., an opto-mechanical attachment mechanism, an electro-opto-mechanical attachment mechanism, a wireless-based attachment mechanism, and the like). Electromechanical attachment mechanism 314 thereby also enables a single display system 300 to be used in conjunction with multiple external devices, and by multiple users. In one embodiment of the disclosed technique, display system 300 is not head-mounted.

Figure 1:
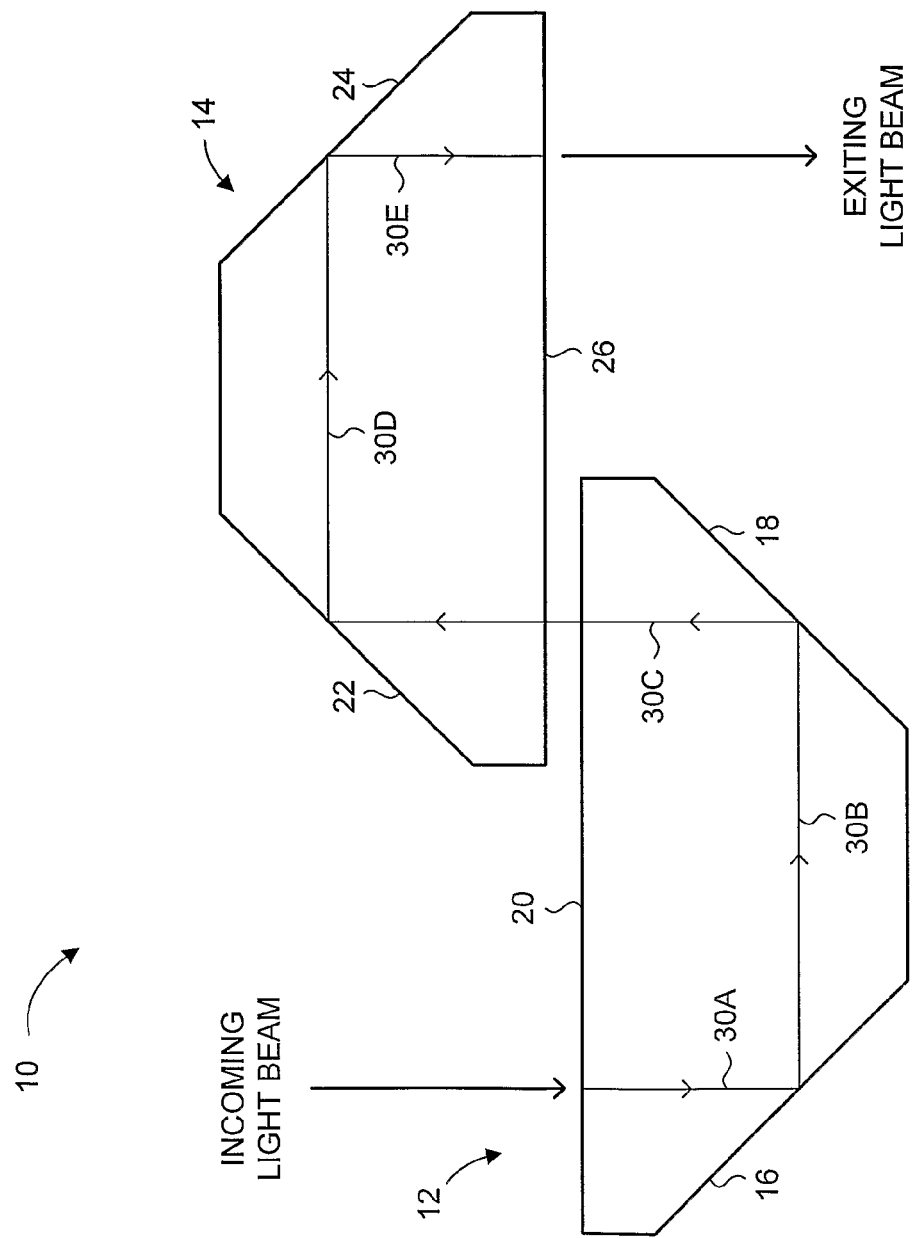
FIG. 1 is a schematic illustration of a double Porro prism assembly, which is known in the art.

Referring back to FIG. 1, display system 100 may be positioned behind a visor. The visor may be clear, tinted, or electronically variable for adjusting the contrast ratio of the combined scene viewed by the user. It is noted that display system 100 provides large enough eye-relief (e.g., at least 25 mm) allowing for use by a user with correcting spectacles. In this case, display system 100 is positioned beyond the correcting spectacles of the user.

Figure 9:
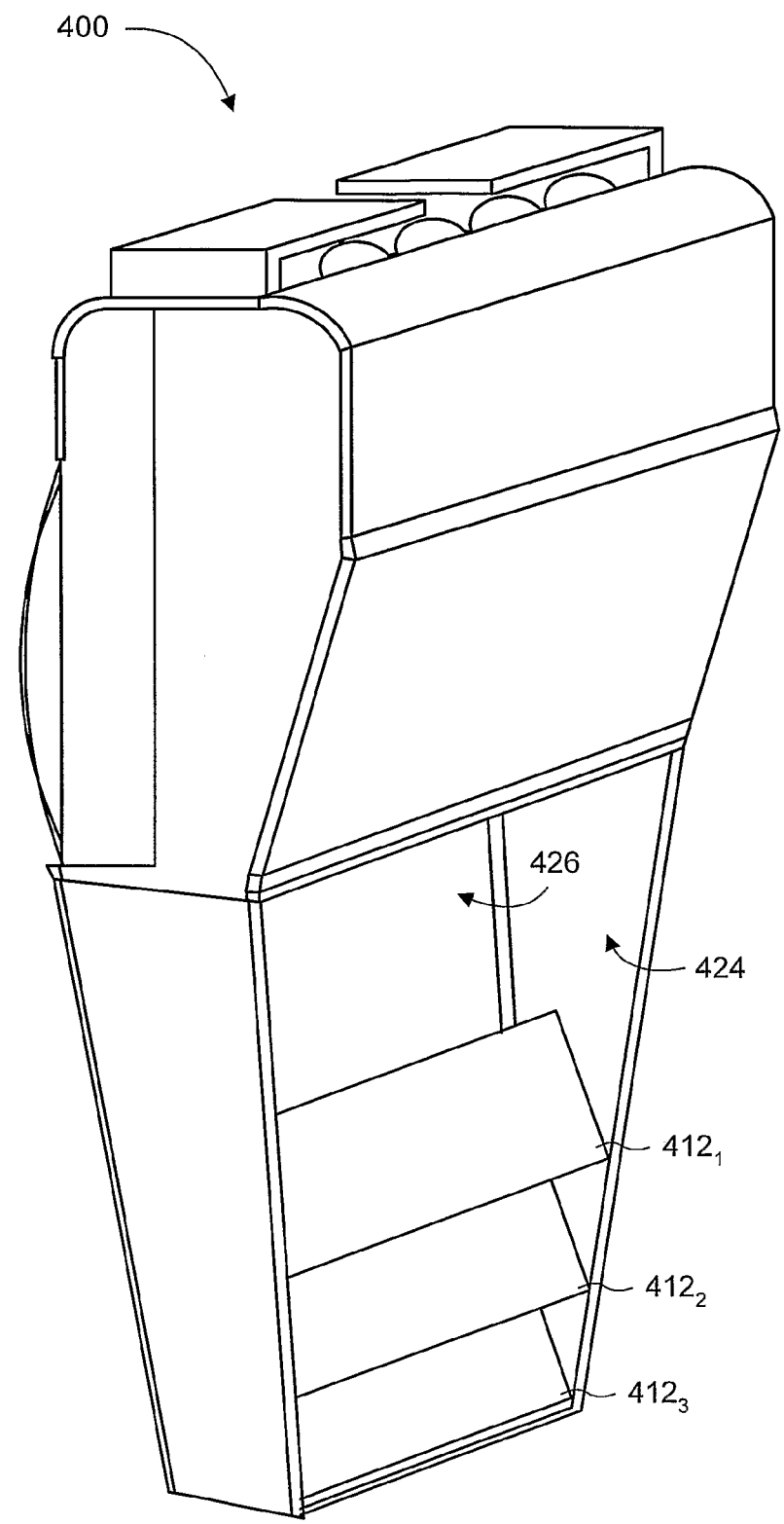
FIG. 9 is a schematic illustration in perspective view of a display system inside a housing, including protective windows, constructed and operative in accordance with yet another embodiment of the disclosed technique.

Reference is now made to FIG. 9, which is a schematic illustration in perspective view of a display system, generally referenced 400, inside a housing, including protective windows, constructed and operative in accordance with yet another embodiment of the disclosed technique. Display system 400 is analogous to display system 100 with reference to FIG. 3, with the addition of protective windows, referenced 424 (i.e., front surface of display system 400 in view of FIG.

9) and 426 (i.e., rear surface of display system 400 in view of FIG. 9), respectively. Protective windows 424 and 426 reduce possible damage to display system 400 from external elements, and are particularly operative to protect beam combiners 412$_1$, 412$_2$, and 412$_3$ from damage. Protective windows 424 and 426 may be transparent, partially transparent, variably transparent, electronically adjustable variably transparent, polarized, and the like. Protective windows 424 and 426 may be made of glass, plastic, a combination of glass and plastic, and the like.

Figure 10:
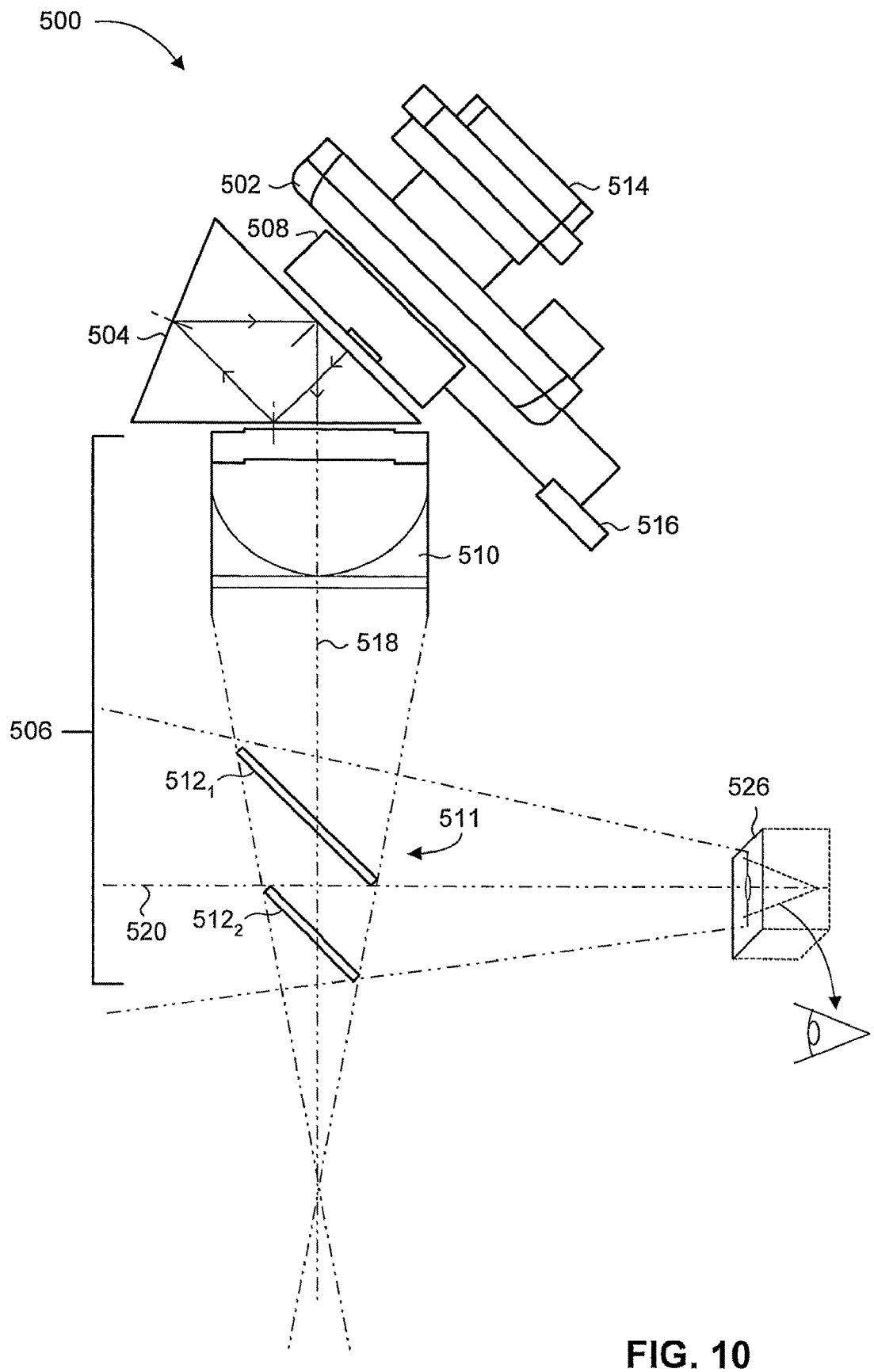
FIG. 10 is a schematic illustration in a side view of another display system, constructed and operative in accordance with yet a further embodiment of the disclosed technique.

According to another embodiment of the disclosed technique, a near eye image display system is provided with fewer optical components. Reference is now made to FIG. 10, which is a schematic illustration in a side view of another display system, generally referenced 500, constructed and operative in accordance with yet a further embodiment of the disclosed technique. Display system 500 includes an image projector 502, a prism 504, an eyepiece 506, a field flattener 508, an electromechanical attachment mechanism 514, and a focus adjustment mechanism 516. Eyepiece 506 includes an optical assembly 510 and a beam combiner assembly 511 having plurality of beam combiners 512$_1$ and 512$_2$. Display system 500 is analogous to display system 100 with reference to FIG. 3, with the exception that prism 504 of display system 500 replaces double prism assembly 104 of display system 100. Furthermore, beam combiner assembly 511 includes only two beam combiners 512$_1$ and 512$_2$, as opposed to beam combiner assembly 111 of display system 100, which includes three beam combiners.

The display size of image projector 502 is substantially small, i.e., as compared to display system 100. For example, image projector 502 uses the Quarter Video Graphics Array (QVGA) display standard. As a result, the focal length of display system 500 is reduced (i.e., as compared to the focal length of display system 100). Therefore, only a single prism is required to reflect the light rays from the display image in a controlled manner to preserve the required focal length of display system 500, while maintaining a reduced physical distance between image projector 502 and eyepiece 506.

Figure 11:
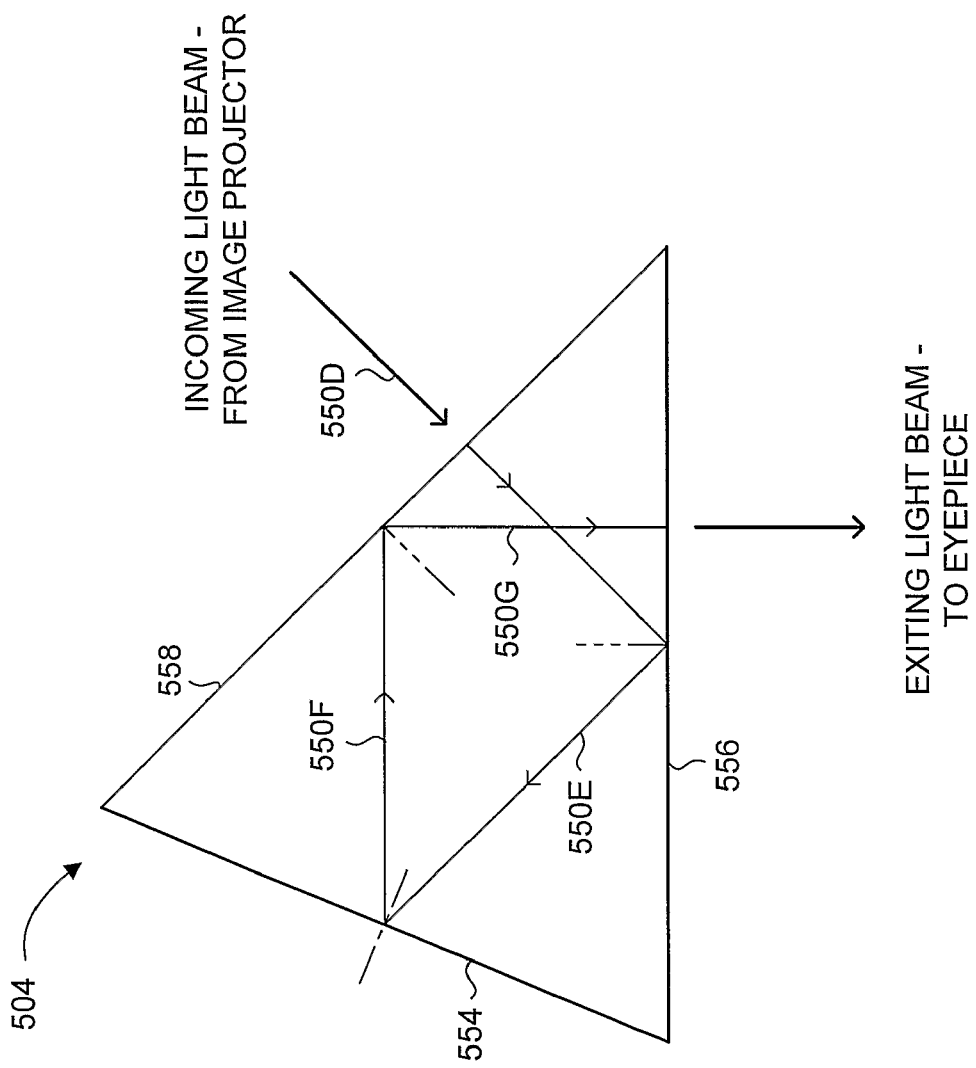
FIG. 11 is an exploded view of the prism of FIG. 10.

Reference is now made to FIG. 11, which is an exploded view of the prism of FIG. 10. Second prism 504 includes a first surface 556, a second surface 558, and a third surface 554. Prism 504 is made of a transparent material. The geometric properties of prism 504 are analogous to the geometric properties of prism 152, with reference to FIG. 5. Referring back to FIG. 10, image projector 502 is aligned at a substantially 45 degree angle with respect to optical pathway 518. In particular, image projector 502 is aligned such that the bottom surface of image projector 502 is parallel to the longest surface (i.e, surface 558) of prism 504.

Surface 558 of prism 504 receives incoming light from a display image from image projector 502, at a substantially perpendicular direction to surface 558. The incoming light beam traverses path 550G and is incident upon surface 556, upon which the light beam is internally reflected along path 550E toward surface 554. Surface 554 internally reflects the light beam toward surface 558 along path 550F. Subsequently, surface 558 of prism 504 internally reflects the light beam along path 550G toward surface 556, upon which the light beam exits prism 504, at a substantially perpendicular direction to surface 556, toward eyepiece 506. The display light undergoes a total of three reflections within prism 504. The substantially small display size of image projector 502 further reduces the field of view of the image presented to the user. As a result, beam combiner assembly 511 needs only two beam combiners 512$_1$ and 512$_2$ to reflect all the display light toward the eye of the user.

Figure 12:
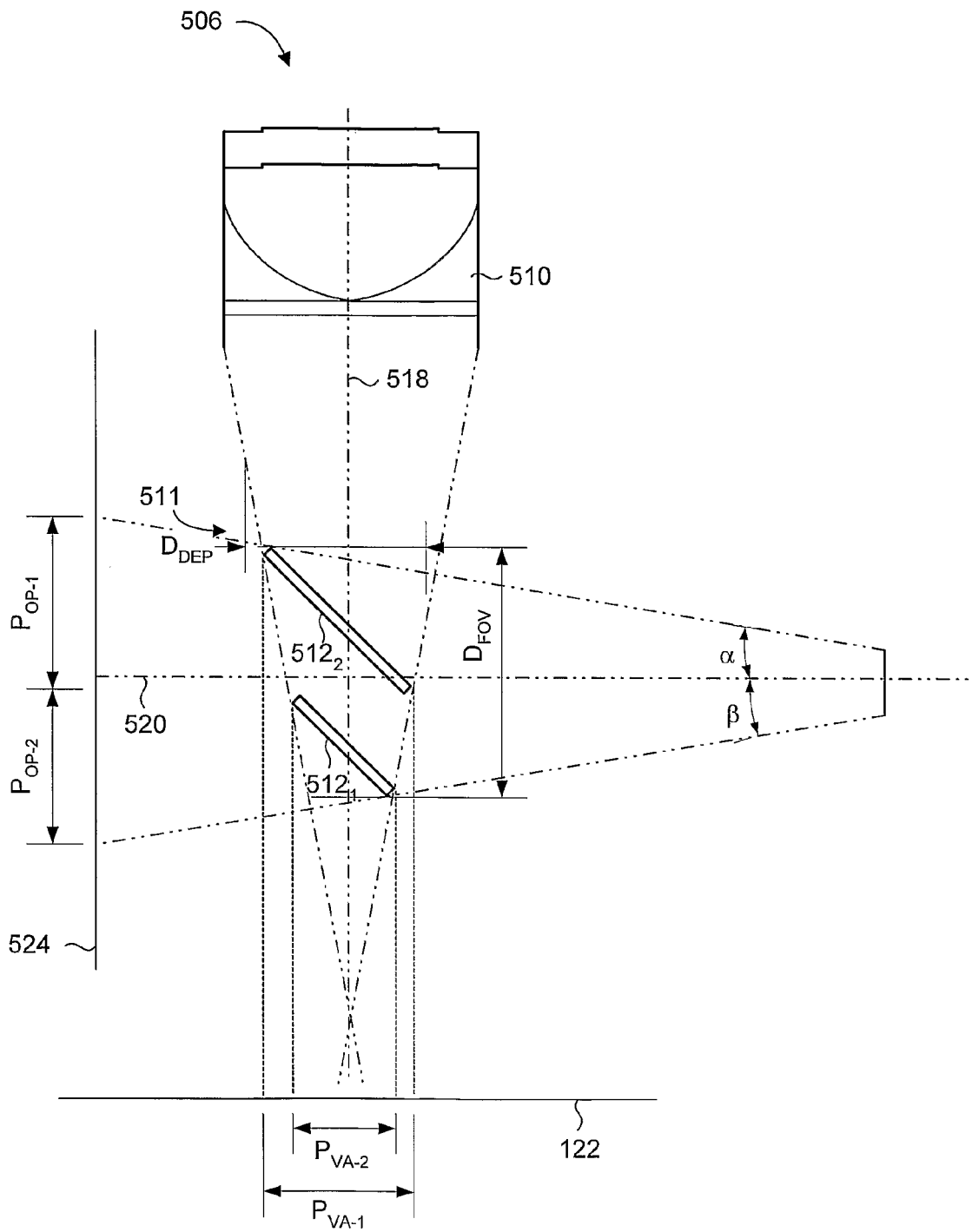
FIG. 12 is an exploded view of the beam combiner assembly of FIG. 10.

Reference is now made to FIG. 12, which is an exploded view of the beam combiner assembly of FIG. 10. The geometric properties of beam combiner assembly 511 of display system 500 are analogous to that of beam combiner assembly 111 of display system 100. It is noted that the field of view provided by eyepiece 506 is identical to the field of view provided by eyepiece 106 with reference to FIG. 6 (denoted $D_{FOV}$ in both Figures). The depth of eyepiece 506 is substantially smaller than the depth of eyepiece 106 (denoted $D_{DEP}$ in both Figures), where depth is measured in terms of the depth of the largest beam combiner in the eyepiece.

It will be appreciated by persons skilled in the art that the disclosed technique is not limited to what has been particularly shown and described hereinabove. Rather the scope of the disclosed technique is defined only by the claims, which follow.

The invention claimed is:

1. Near eye image display system comprising:
   an image projector, projecting a display image toward an optical pathway, said optical pathway intersecting a viewing axis, said viewing axis extending from the eye of a user to an ambient scene;
   a beam combiner assembly comprising a plurality of beam combiners, said beam combiners optically cascaded along said optical pathway, each of said beam combiners being disposed diagonally to said optical pathway and diagonally to said viewing axis;
   each of said beam combiners arranged such that for each two adjacent said beam combiners, the first of said adjacent beam combiners being optically located between the second of said adjacent beam combiners and said image projector, the geometrical projection of said second beam combiner onto a first plane being perpendicular to said optical pathway, is subsumed within the geometrical projection of said first beam combiner onto said first plane,
   each of said beam combiners further arranged such that the partial geometric projection of each of said beam combiners onto a second plane being perpendicular to said viewing axis, forms a continuous geometric projection; and
   an optical assembly, optically coupled between said image projector and said beam combiner assembly, said optical assembly directing display light of said display image from said image projector toward said beam combiner assembly along said optical pathway; and
   a double prism assembly optically coupled between said image projector and said optical assembly, said double prism assembly including a first prism and a second prism, each said first prism and said second prism having at least a first surface, a second surface and a third surface, wherein said first surface, said second surface and said third surface are geometrically extendable to form a triangle, each said first prism and said second prism being made of transparent material,
   wherein said first surface of said first prism is coupled to said image projector, said first prism receiving said display light from said image projector, at a substantially perpendicular direction to said first surface of said first prism,
   wherein said first surface of said second prism is coupled to said optical assembly, said second prism directing said display light toward said optical assembly, at a substantially perpendicular direction to said first surface of said second prism, wherein for each of said first prism and said second prism, the angle between said third surface and said first surface is substantially 67°30'

$$\left(\frac{3\pi}{8}\right),$$

the angle between said third surface and said second surface is substantially 67°30'

$$\left(\frac{3\pi}{8}\right),$$

and the angle between said first surface and said second surface substantially 45°

$$\left(\frac{\pi}{4}\right),$$

wherein said second surface of said first prism is disposed adjacent to said second surface of said second prism, with a transparent medium there between, wherein the ratio between the refractive index of said transparent material and the refractive index of said transparent medium is such that said ratio produces total internal reflection of a first light beam, incident on said second surface of said first prism, said first light beam arriving at said second surface of said first prism at a substantially perpendicular direction to said first surface of said first prism, said ratio further producing total internal reflection of a second light beam incident on said second surface of said second prism, said second light beam exiting said second surface of said second prism at a substantially perpendicular direction to said first surface of said second prism, wherein for each of said first prism and said second prism, said third surface is optically reflective, providing total internal reflection, wherein said double prism assembly directs said display light toward said optical assembly along said optical pathway, and wherein each of said beam combiners reflects said display light toward said eye, and wherein each of said beam combiners further directs ambient light emerging from said ambient scene toward said eye, thereby superimposing said display image onto said ambient scene.

2. The system according to claim 1, wherein said optically reflective third surface of each of said first prism and said second prism is coated with a reflective coating.

3. The system according to claim 1, wherein a reflective medium is positioned adjacent to said optically reflective third surface of each of said first prism and said second prism includes.

4. The system according to claim 1, wherein said display light enters said double prism assembly via said first surface of said first prism, at a substantially perpendicular direction to said first surface of said first prism, toward said second surface of said first prism, said second surface of said first prism reflects said display light toward said third surface of said first prism, said third surface of said first prism reflects said display light toward said first surface of said first prism, said first surface of said first prism reflects said display light toward said first surface of said second prism, said first surface of said second prism reflects said display light toward said third surface of said second prism, said third surface of said second prism reflects said display light toward said second surface of said second prism, and said display light exits said double prism assembly via said first surface of said second prism at a substantially perpendicular direction to said first surface of said second prism.

5. The system according to claim 1, further comprising a field flattener optically coupled with said image projector,
said field flattener flattens the image plane of said display image projected by said image projector.

6. The system according to claim 5, further comprising a focus adjustment mechanism coupled with said image projector and with said field flattener,
said focus adjustment mechanism adjusting the focus of said display image projected by said image projector.

7. The system according to claim 6, wherein said focus adjustment mechanism adjusts the focus of said display image projected by said image projector so that said display image appears at optical infinity.

8. The system according to claim 6, wherein said focus adjustment mechanism adjusts the focus of said display image projected by said image projector so that said display image appears nearby.

9. The system according to claim 1, further comprising an electronic interface coupled with said image projector,
said electronic interface interfacing between said display system and external electronic components.

10. The system according to claim 1, wherein said image projector is selected from the list consisting of:
a transmissive display;
a reflective display; and
an emissive display.

11. The system according to claim 1, wherein said image projector receives an image representation from an external source, and projects an image in accordance with said image representation.

12. The system according to claim 1, wherein said display image is electronically pre-distorted in accordance with optical properties of said system.

13. The system according to claim 1, wherein said beam combiners are straight lengthwise.

14. The system according to claim 1, wherein said beam combiners are curved lengthwise.

15. The system according to claim 1, wherein said beam combiners are holographic.

16. The system according to claim 15, wherein said beam combiners transmit only certain wavelengths of light.

17. The system according to claim 1, wherein said beam combiners are polarized.

18. The system according to claim 17, wherein said image projector generates polarized light, and wherein said beam combiners transmit only one type of polarization.

19. The system according to claim 1, wherein each of said beam combiners have different levels of transmittance or reflectance.

20. The system according to claim 1, wherein the ratio between the amount of said display light and the amount of said ambient light reaching said eye, is adjustable.

21. The system according to claim 1, further comprising an attachment mechanism coupled with said projector,
said attachment mechanism attaching and detaching said system to an external device,
said attachment mechanism further interfacing between said system and external electronic components.

22. The system according to claim 21, wherein said system is mounted via said attachment mechanism onto eyewear.

23. The system according to claim 22, wherein said eyewear is selected from the list consisting of:
- eyeglasses;
- spectacles; and
- goggles.

24. The system according to claim 21, wherein said system is mounted via said attachment mechanism onto head gear.

25. The system according to claim 24, wherein said head gear is selected from the list consisting of:
- a mask; and
- a helmet.

26. The system according to claim 21, wherein said attachment mechanism is selected from the list consisting of:
- an electro-mechanical attachment mechanism;
- an opto-mechanical attachment mechanism;
- an electro-opto-mechanical attachment mechanism; and
- a wireless-based attachment mechanism.

27. The system according to claim 26, wherein said protective windows is selected from the list consisting of:
- transparent;
- partially transparent;
- variably transparent;
- electronically adjustable variably transparent; and
- polarized.

28. The system according to claim 1, wherein said system is inside housing comprising protective windows.

29. The system according to claim 1, wherein said optical pathway is substantially perpendicular to said viewing axis.

30. The system according to claim 1, wherein said viewing axis is at an angle with respect to said optical pathway.

31. Near eye image display system comprising
an image projector, projecting a display image toward an optical pathway, said optical pathway intersecting a viewing axis, said viewing axis extending from the eye of a user to an ambient scene;
a beam combiner assembly comprising a plurality of beam combiners, said beam combiners optically cascaded along said optical pathway, each of said beam combiners being disposed diagonally to said optical pathway and diagonally to said viewing axis,
each of said beam combiners arranged such that for each two adjacent said beam combiners, the first of said adjacent beam combiners being optically located between the second of said adjacent beam combiners and said image projector, the geometrical projection of said second beam combiner onto a first plane being perpendicular to said optical pathway, is subsumed within the geometrical projection of said first beam combiner onto said first plane,
each of said beam combiners further arranged such that the partial geometric projection of each of said beam combiners onto a second lane being perpendicular to said viewing axis, forms a continuous geometric projection;
an optical assembly, optically coupled between said image projector and said beam combiner assembly, said optical assembly directing display light of said display image from said image projector toward said beam combiner assembly along said optical pathway; and
a prism, optically coupled between said image projector and said optical assembly,
said prism having at least a first surface, a second surface and a third surface, wherein said first surface, said second surface and said third surface are geometrically extendable to form a triangle, said prism being made of transparent material,
wherein the angle between said third surface and said first surface is substantially 67°30'

$$\left(\frac{3\pi}{8}\right),$$

the angle between said third surface and said second surface is substantially 67°30'

$$\left(\frac{3\pi}{8}\right),$$

and the angle between said first surface and said second surface substantially 45°

$$\left(\frac{\pi}{4}\right),$$

wherein said third surface is optically reflective, providing total internal reflection,
wherein said first surface of said prism is coupled to said image projector, said prism receiving said display light from said image projector, at a substantially perpendicular direction to said first surface of said prism; and
wherein said second surface of said prism is coupled to said optical assembly, said display light is reflected by said second surface of said prism toward said third surface of said prism, said display light is reflected by said third surface of said prism toward said first surface of said prism, said display light is reflected by said first surface of said prism toward said second surface of said prism at a substantially perpendicular direction to said second surface of said prism, said prism directing said display light toward said optical assembly.

32. The system according to claim 31, wherein said optically reflective third surface of said prism is coated with a reflective coating.

33. The system according to claim 31, wherein a reflective medium is positioned adjacent to said optically reflective third surface of said prism.

34. The system according to claim 31, further comprising a field flattener optically coupled with said image projector,
said field flattener flattens the image plane of said display image projected by said image projector.

35. The system according to claim 31, further comprising an electronic interface coupled with said image projector,
Said electronic interface interfacing between said display systems and external electronic components.

36. The system according to claim 31, wherein said image projector is selected from the list consisting of:
- a transmissive display;
- a reflective display; and
- an emissive display.

37. The system according to claim 31, wherein said image projector receives an image representation from an external source, and projects an image in accordance with said image representation.

38. The system according to claim 31, wherein said display image is electronically pre-distorted in accordance with optical properties of said system.

39. The system according to claim 31, wherein said beam combiners are straight lengthwise.

40. The system according to claim 31, wherein said beam combiners are curved lengthwise.

41. The system according to claim 31, wherein said beam combiners are holographic.

42. The system according to claim 31, wherein said beam combiners are polarized.

43. The system according to claim 31, wherein each of said beam combiners have different levels of transmittance or reflectance.

44. The system according to claim 31, wherein the ratio between the amount of said display light and the amount of said ambient light reaching said eye, is adjustable.

45. The system according to claim 31, further comprising an attachment mechanism coupled with said projector,
said attachment mechanism attaching and detaching said system to an external device, said attachment mechanism further interfacing between said system and external electronic components.

46. The system according to claim 31 wherein said system is inside housing comprising protective windows.

47. The system according to claim 31, wherein said optical pathway is substantially perpendicular to said viewing axis.

48. The system according to claim 31, wherein said viewing axis is at an angle with respect to said optical pathway.

49. A double prism assembly, for folding the light rays from a display image, said double prism assembly comprising a first prism and a second prism, each said first prism and said second prism having at least a first surface, a second surface and a third surface, wherein said first surface, said second surface and said third surface are geometrically extendable to form a triangle, each said first prism and said second prism being made of transparent material, said double prism assembly reflecting said light rays within said first prism and said second prism in a controlled manner,
wherein said first surface of said first prism is coupled to said image projector, said first prism receiving said display light from said image projector, at a substantially perpendicular direction to said first surface of said first prism,
wherein said first surface of said second prism is coupled to said optical assembly, said second prism directing said display light toward said optical assembly, at a substantially perpendicular direction to said first surface of said second prism,
wherein for each of said first prism and said second prism, the angle between said third surface and said first surface is substantially 67°30'

$$\left(\frac{3\pi}{8}\right),$$

the angle between said third surface and said second surface is substantially 67°30'

$$\left(\frac{3\pi}{8}\right),$$

and the angle between said first surface and said second surface substantially 45°

$$\left(\frac{\pi}{4}\right),$$

wherein said second surface of said first prism is disposed adjacent to said second surface of said second prism, with a transparent medium there between, wherein the ratio between the refractive index of said transparent material and the refractive index of said transparent medium is such that said ratio produces total internal reflection of a first light beam, incident on said second surface of said first prism, said first light beam arriving at said second surface of said first prism at a substantially perpendicular direction to said first surface of said first prism, said ratio further producing total internal reflection of a second light beam incident on said second surface of said second prism, said second light beam exiting said second surface of said second prism at a substantially perpendicular direction to said first surface of said second prism,
wherein for each of said first prism and said second prism, said third surface is optically reflective, providing total internal reflection.

* * * * *